(12) United States Patent
Longhenry et al.

(10) Patent No.: US 6,215,504 B1
(45) Date of Patent: Apr. 10, 2001

(54) LINE DRAWING USING OPERAND ROUTING AND OPERATION SELECTIVE MULTIMEDIA EXTENSION UNIT

(75) Inventors: Brian E. Longhenry, Cypress; Gary W. Thome, Tomball; John S. Thayer, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/905,685

(22) Filed: Aug. 1, 1997

Related U.S. Application Data

(63) Continuation-in-part of application No. 08/777,687, filed on Dec. 20, 1996, and a continuation-in-part of application No. 08/771,755, filed on Dec. 20, 1996.

(51) Int. Cl.[7] .................................................. G06T 11/20
(52) U.S. Cl. ............................................................ 345/443
(58) Field of Search .................................. 345/443, 502, 345/505, 135; 708/290

(56) References Cited

U.S. PATENT DOCUMENTS

| | | | |
|---|---|---|---|
| 4,730,261 | * 3/1988 | Smith | 364/521 |
| 4,901,266 | * 2/1990 | Takagi | 364/723 |
| 5,001,651 | * 3/1991 | Rehme et al. | 364/518 |
| 5,020,014 | 5/1991 | Miller et al. | 364/723 |
| 5,175,701 | 12/1992 | Newman et al. | 364/723 |
| 5,627,956 | 5/1997 | Dao et al. | 395/143 |
| 5,636,153 | 6/1997 | Ikegaya et al. | 364/736 |
| 5,694,345 | 12/1997 | Peterson | 364/723 |

OTHER PUBLICATIONS

Kohn, L., et al., The Visual Instruction Set (VIS) in Ultra SPARC™, IEEE (1995), pp. 482–489.
Lee, Ruby B., Realtime MPEG Video via Software Decompression on a PA–RISC Processor, IEEE (1995), pp. 186–192.
Zhou, et al., MPEG Video Decoding with the UltraSPARC Visual Instruction Set, IEEE (1995), pp. 470–474.
Papamichalis, Panos, An Implementation of FFT, DCT, and other Transforms on the TMS320C30, (1990), pp. 53–119.
Gwennap, Linley, UltraSparc Adds Multimedia Instructions, Microprocessor Report, Dec. 5, 1994, pp. 16–18.
Goslin, Gregory Ray, Implement DSP functions of FPGAs to reduce cost and boost performance, EDN, Oct. 10, 1996, pp. 155–164.
Hearn & Baker, Computer Graphics (1986), pp. 58–61.
Programmer's Reference Manual, Intel Architecture MMX™ Technology, Chapters 2–5, Intel Corp., printed Sep. 26, 1996.
"Computer Graphics": James D. foley, Andries van Dam, Steven K. Feiner, John F. Hughes; Section3.2.2, 1992.*

* cited by examiner

Primary Examiner—Mark Zimmerman
Assistant Examiner—Mano Padmanabhan
(74) Attorney, Agent, or Firm—Akin, Gump, Strauss, Hauer & Feld, LLP

(57) ABSTRACT

A routable operand and selectable operation processor multimedia extension unit is employed to draw lines in a video system using an efficient, parallel technique. A first series of integral y pixel values and error values are calculated according to Bresenham's line drawing algorithm. Then, subsequent pixels and error values are calculated in parallel based on the previously calculated values.

11 Claims, 17 Drawing Sheets

LINE DRAWING USING OPERAND ROUTING AND OPERATION SELECTIVE MULTIMEDIA EXTENSION UNIT

RELATED APPLICATIONS

This application is a continuation-in-part of U.S. patent application Ser. No. 08/777,687, filed Dec. 20, 1996, entitled Line Drawing Using Operand Routing and Operation Selective Multimedia Extension Unit, and is a continuation-in-part of U.S. patent application Ser. No. 08/771,755, filed Dec. 20, 1996, entitled Bit Map Stretching Using Operand Routing and Operation Selective Multimedia Extension Unit, both of which are hereby incorporated by reference.

BACKGROUND OF THE INVENTION

1. Field of the Invention

The invention pertains to parallel algorithms for execution by a operand-rerouting, multi-operation vector processor. More specifically, the invention relates to an improved line drawing technique on such a processor.

2. Description of the Related Art

The microcomputer industry has seen a metamorphosis in the way computers are used over the last number of years. Originally, most operating systems were text based requiring typed user input and providing textual response. These systems have given way to graphical based environments. Current systems are heavily graphically based, both providing graphical user interfaces including icons, windows, and the like, and providing graphical interaction with a user through a variety of user input devices.

This trend is likely to continue. But graphical, multimedia environments place different and greater demands on processor capabilities than the old textual environments. For many years, the Intel x86 series of processors by Intel Corporation has provided the computing power for IBM PC compatible machines. The architecture of the Intel design, however, is not optimized towards graphical operations.

To this end, a number of extensions to the x86 architecture have been proposed and developed. These include the MMX extensions developed by Intel Corporation. Further, other manufacturers have similarly extended their instruction sets. For example, Sun Microcomputing has developed the UltraSparc, a graphics extension of the SPARC V9 architecture.

Typical vector processors provide for multiple operations simultaneously, but require that the same operation be performed by each partition within the vector (SIMD, or single instruction multiple data). In the multimedia extension unit architecture, this has changed. Not only can multiple operations be concurrently executed on vectorized data, but different operations can be simultaneously performed, and the vectorized data can be rerouted through a number of multiplexers.

This architecture presents a number of possibilities, but developing algorithms that efficiently utilize this architecture places its own demands, given the new features of the instruction set. It is desirable to efficiently utilize this architecture to execute algorithms for multimedia.

SUMMARY OF THE INVENTION

According to the invention, a multimedia extension unit architecture draws lines on a graphical display through new, faster, and unique techniques. The line drawing algorithm is highly vectorized, even though the Bresenham algorithm has historically been a serially executed algorithm.

A first sequence of Y pixel values and error values are calculated serially. Then, subsequent Y pixel values are calculated in parallel based on the previous Y and error values using the rerouting and operation selection of the multimedia extension unit.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
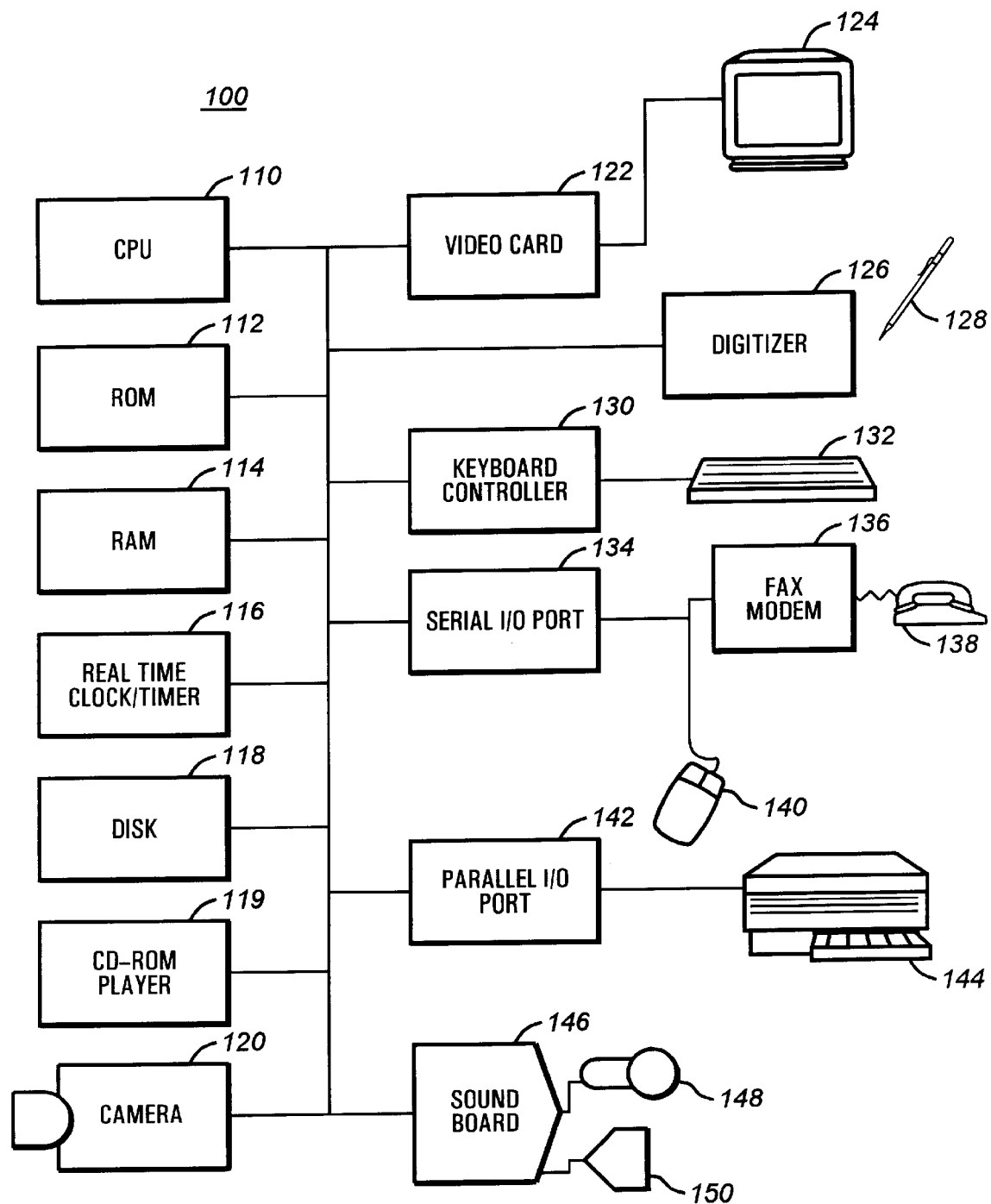
FIG. 1 is a block diagram of a computer system having a processor and a multimedia extension unit of the present invention.
Figure 2:
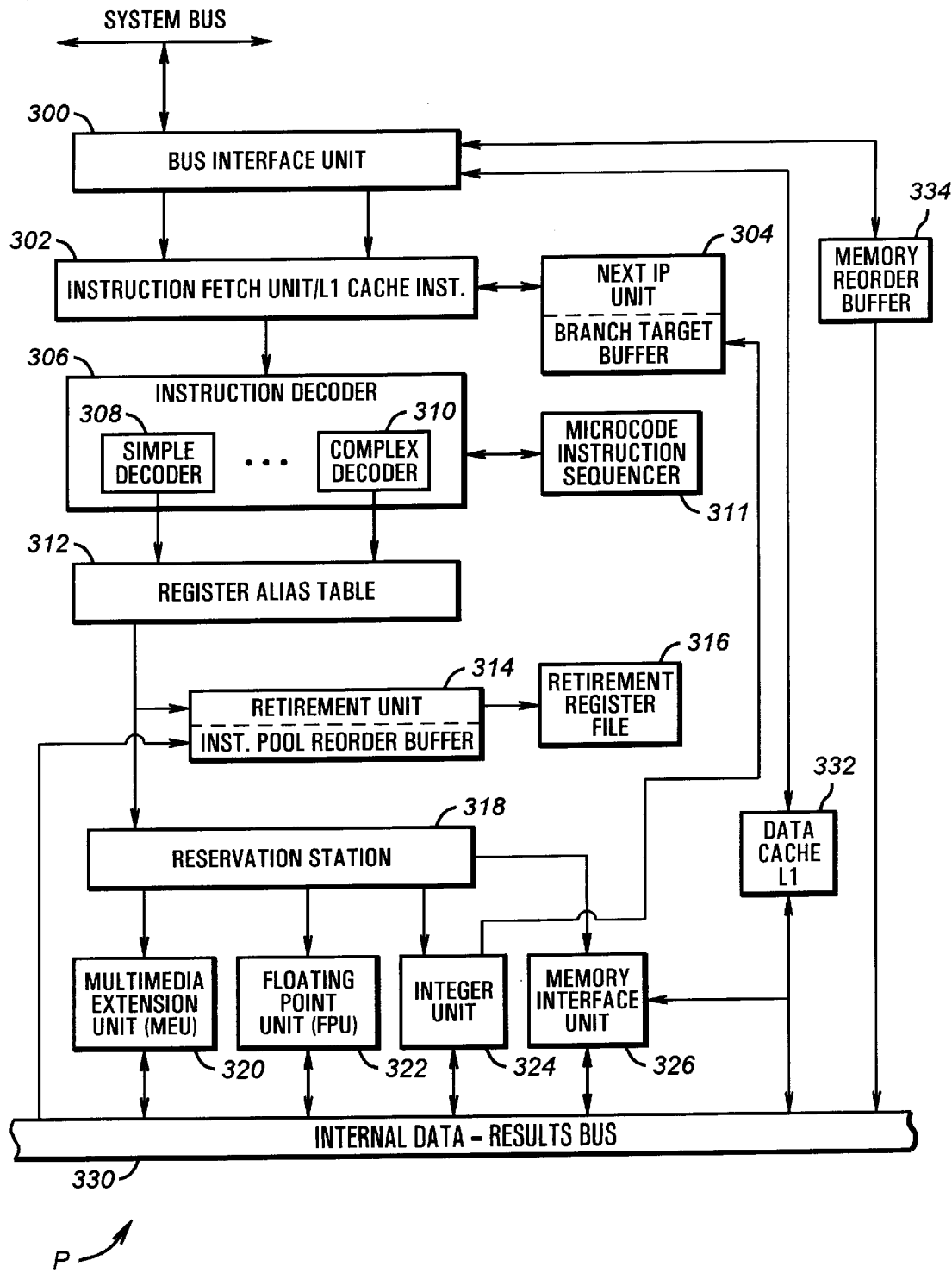
FIG. 2 shows a micro-architecture of the processor and the multimedia enhanced unit of FIG. 1.

Turning now to the drawings, FIG. 1 shows a block diagram of a computer 100. In FIG. 1, a central processing unit (CPU) 110 provides processing power for the computer system 100. The CPU 110 is preferably an Intel Pentium-Prog processor with an multimedia extension unit (MEU), as shown in FIG. 2. However, a number of other microprocessors suitably equipped with an MEU may be used, including a PowerPC microprocessor, an R4000 microprocessor, a Sparc microprocessor, or an Alpha microprocessor, among others. The CPU 110 is connected to a read only memory (ROM) 112. The ROM 112 provides boot code such as a system BIOS software that boots up the CPU 110 and executes a power up self test (POST) on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. The CPU 110 is also connected to a real time clock and timer 116. The real time clock and timer 116 stores the dates and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable code as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface.

Additionally, the CPU 110 is connected to a camera 120. The camera 120 supports video conferencing between the user and other users. The camera 120 essentially consists of a lens, a charge-coupled-device (CCD) array, and an analog to digital converter. The lens focuses light onto the CCD array, which generates voltages proportional to the light. The analog voltages generated by the CCD array are converted into a digital form by the analog to digital converter for processing by the CPU 110.

The CPU 110 is also connected to a video card 122. On the back of the video card 122 are one or more jacks. Connectors for monitors can be plugged into the jacks. The connectors, which are adapted to be plugged into the jacks of the video card 122, eventually are connected to the input of a monitor 124 for display.

A pen-based user interface is also provided. A digitizer 126 is connected to the CPU 110 and is adapted to capture user input. Additionally, a pen 128 is provided to allow the user to operate the computer. The pen 128 and digitizer 126 in combination supports another mode of data entry in addition to a keyboard 132.

While the video monitor 124 receives the output signals from the CPU 110 to the user, the keyboard 132 is connected to a keyboard controller 130 for providing input information to the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to an Internet service provider 90, for example. Preferably, the modem 136 is a 28.8 kilobits per second modem (or greater) that converts information from the computer into analog signals transmitted by ordinary phone lines or plain old telephone service (POTS). Alternatively, the modem 136 could connect via an integrated service digital network (ISDN) line to transfer data at higher speeds.

Furthermore, a parallel input/output (I/O) port 142 is provided to link to other peripherals. Connected to the parallel I/O port 142 is a laser printer 144. Additionally, a microphone 148 is connected to a sound board 146 which eventually provides input to the CPU 110 for immediate processing or to a disk drive 118 for offline storage. The sound board 146 also drives a music quality speaker 150 to support the multimedia-based software. As multimedia programs use several medium, the multimedia computer system of the present invention integrates the hardware of the computer system 100 of the present invention. For example, the sound board 146 is used for sound, the monitor 124 is used to display movies and the CD-ROM player 119 is used for audio or video. In this manner, sounds, animations, and video clips are coordinated to make the computer session more friendly, usable and interesting.

Turning now to FIG. 2, a functional block diagram of the processor microarchitecture employed by the present invention is shown. The processor of the present invention is preferably based on an Intel-compatible Pentium-Pro microprocessor. The mode employed by the present invention is in addition to the existing modes of the 486 and Pentium processors, and unless otherwise indicated, the operation and features of the processors remain unchanged. Familiarity with the operation of the 486, Pentium and Pentium Pro are assumed in this description. For additional details, reference should be made to the appropriate data book. However, the invention could also be used in earlier processor generations such as the Intel Pentium™, 80486™, 80386™, 80286™, and 8086™ microprocessors. The use of the features of the multimedia extension unit could also be used with other types of microprocessors, including without limitation, the Power PC architecture, the Sparc architecture, and the MIPS R4000 architecture. For purposes of this disclosure, the terms microprocessor and processor can be used interchangeably.

In FIG. 2, the processor P employed by the present invention interacts with the system bus and the Level 2 cache (not shown) via a bus interface unit 300. The bus interface unit 300 accesses system memory through the external system bus. Preferably, the bus interface unit is a transaction oriented 64-bit bus such that each bus access handles a separate request and response operation. Thus, while the bus interface unit 300 is waiting for a response to one bus request, it can issue additional requests. The interaction with the Level 2 cache via the bus interface unit 300 is also transaction oriented. The bus interface unit 300 is connected to a combination instruction fetch unit and a Level 1 instruction cache 302. The instruction fetch unit of the combination unit 302 fetches a 32-byte cache line per clock from the instruction cache in the combination unit 302. The combination unit 302 is also connected to an instruction pointer unit and branch target buffer combination 304. The branch target buffer in turn receives exception/interrupt status and branch misprediction indications from an integer execution unit 324, as discussed below.

Additionally, the instruction fetch unit/L1 cache combination 302 is connected to an instruction decoder 306. The instruction decoder 306 contains one or more simple decoders 308 and one or more complex decoders 310. Each of decoders 308 and 310 converts an instruction into one or more micro-operations ("micro-ops"). Micro-operations are primitive instructions that are executed by the processor's execution unit. Each of the micro-operations contains two logical sources and one logical destination per micro-operation.

The processor P has a plurality of general purpose internal registers which are used for actual computation, which can be either integer or floating point in nature. To allocate the internal registers, the queued micro-ops from the instruction decoder 306 are sent to a register 10 alias table unit 312 where references to the logical register of the processor P are converted into internal physical register references. Subsequently, allocators in the register alias table unit 312 add status bits and flags to the micro-ops to prepare them for out of order execution and sends the resulting micro-ops to an instruction pool 314.

The instruction pool 314 is also connected to a reservation station 318. The reservation station 318 also receives the output of the register alias table 312. The reservation station 318 handles the scheduling and dispatching of micro-ops from the instruction pool 314. The reservation station 318 supports classic out-of-order execution where micro-ops are dispatched to the execution unit strictly according to data flow constraints and execution resource availability to optimize performance.

The reservation station 318 is in turn connected to a plurality of execution units, including a multimedia extension unit (MEU) 320, a floating point unit (FPU) 322, an integer unit (IU) 324, and a memory interface unit (MIU) 326. The MEU 320, FPU 322, IU 324 and MWJ 326 are in turn connected to an internal data-results bus 330. The internal data-results bus 330 is also connected to the instruction pool 314, a Level 1 data cache 332 and a memory reorder buffer 334. Furthermore, the Level 1 data cache 332 and the memory reorder buffer 334 are connected to the bus interface unit 300 for receiving multiple memory requests via the transaction oriented bus interface unit 300. The memory reorder buffer 334 functions as a scheduling and dispatch station to track all memory requests and is able to reorder some requests to prevent data blockage and to improve throughput.

Turning now to the execution units, the memory interface unit 326 handles load and store micro-ops. Preferably, the memory interface unit 326 has two ports, allowing it to process the address on a data micro-op in parallel. In this manner, both a load and a store can be performed in one clock cycle. The integer unit 324 is an arithmetic logic unit (ALU) with an ability to detect branch mispredictions. The floating point execution units 322 are similar to those found in the Pentium processor. From an abstract architectural view, the FPU 322 is a coprocessor that operates in parallel with the integer unit 324. The FPU 322 receives its instruction from the same instruction decoder and sequencer as the integer unit 324 and shares the system bus with the integer unit 324. Other than these connections, the integer unit 324 and the floating point unit 322 operate independently and in parallel.

In the preferred embodiment, the FPU 322 data registers consist of eight 80-bit registers. Values are stored in these registers in the extended real format. The FPU 322 instructions treat the eight FPU 322 data registers as a register stack. All addressing of the data registers is relative to the register on top of the stack. The register number of the current top of stack register is stored in the top. Load operations decrement the top by one and load a value into the new top of stack register, and store operations store the value from the current top register in memory and then increment top by one. Thus, for the FPU 322, a load operation is equivalent to a push and a store operation is equivalent to a pop in the conventional stack.

Referring now to the multimedia extension unit (MEU) 320, the MEU 320 enhances the instruction set to include vector instructions, partitioned instructions operating on small data elements, saturating arithmetic, fixed binary point data, data scaling support, multimedia oriented ALU functions, and flexible operand routing. To preserve compatibility and minimize the hardware/software impact, the MEU 320 uses the same registers as the FPU 322. When new multimedia instructions are executed on the MEU 320, the registers of the FPU 322 are accessed in pairs. As the FPU 322 registers each have 80 bits of data, the pairing of the FPU 322 registers effectively creates four 160-bit wide registers, as further discussed below. Furthermore, the MEU 320 adds newly defined instructions which treat registers as vectors of small fixed point data values rather than large floating point numbers. Since the operating system saves the entire state of the FPU 322 as necessary during context switches, the operating system needs not be aware of the new functionality provided by the MEU 320 of the present invention. Although the disclosed system contemplates that the MEU 320 and the FPU 322 share logic or registers, the processor P could simply have snooping logic that maintains coherency between register values in completely separate MEU 320 and FPU 322 sections.

With respect to status and control bits, the FPU 322 has three registers for status and control: status word, control word, and tag word. These FPU 322 registers contain bits for exception flags, exception masks, condition codes, precision control, routing control and stack packs. The MBU 320 does not use or modify any of these bits except for the stack pack bits, which is modified because the MEU 320 result values are often not valid floating point numbers. Thus, anytime a MEU instruction is executed, the entire FPU tag word is set to 0xffffh, marking all FPU 322 registers as empty. In addition, the top of stack pointer in the FPU 322 status words (bits 11–13) is set to 0 to indicate an empty stack. Thus, any MEU 320 instruction effectively destroys any floating point values that may have been in the FPU 322. As the operating system saves and restores the complete FPU state for each task, the destruction of floating point values in the FPU 322 is not a problem between tasks. However, appropriate software action may need to be taken within a single task to prevent errors arising from modifications to the FPU 322 registers.

The sharing of the registers of the FPU 322 and the MEU 320 avoids adding any new software visible context, as the MEU 320 does not define any new processor status, control or condition code bits other than a global MEU extension enable bit. Furthermore, the MEU 320 can execute concurrently with existing instructions on the registers of the integer unit 324. Therefore, the CPU 110 logic is well utilized as the MEU 320 is efficiently dedicated to signal processing applications while the FPU 322 is dedicated to floating point intensive applications and the integer unit 324 handles addressing calculations and program flow control. Additionally, the MEU 320 allows for scalability and modularity, as the MEU 320 does not change the integer or load/store units. Thereby, the CPU 110 core design is not impacted when the MEU 320 is included or excluded from the processor P.

Figure 3:
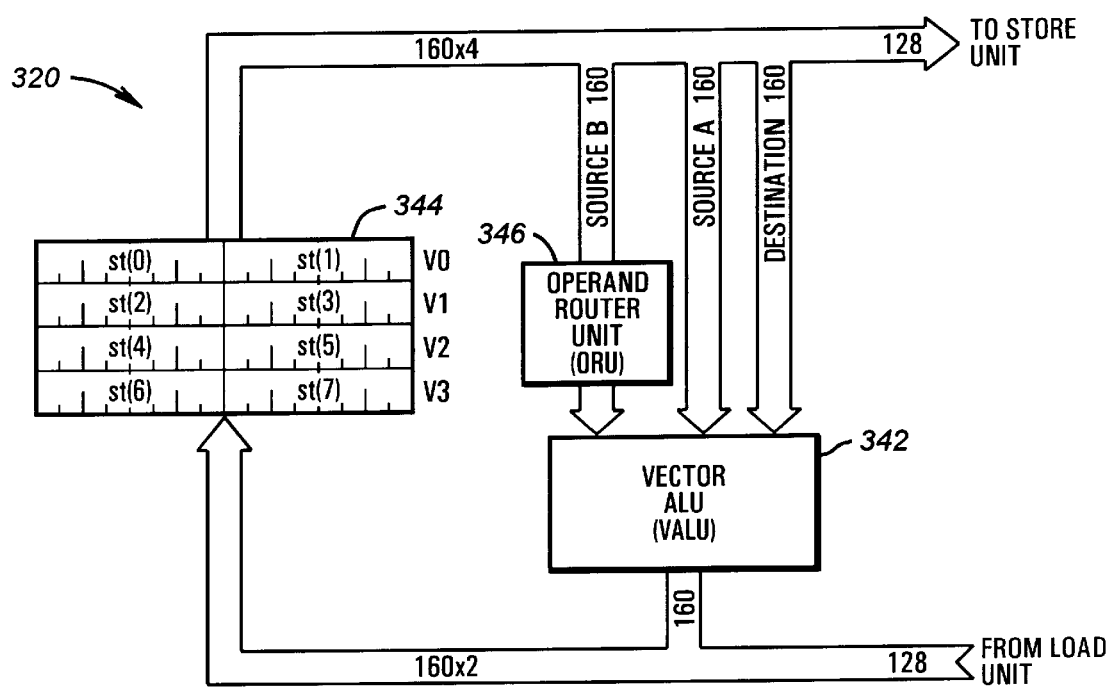
FIG. 3 is a more detailed block diagram of the multimedia extension unit of FIG. 2.

Referring now to FIG. 3, a more detailed block diagram of the MEU 320 is shown. The EMU 320 contains a vector arithmetic logic unit (VALU) 342. The VALU 342 is in turn connected to a plurality of vector registers 344, preferably four. These vector registers are preferably the same registers as those present in the FPU 322.

In the MEU 320, the FPU registers 344 are accessed in pairs. As each of the FPU 322 registers is 80 bits in width, the pairing of the FPU 322 registers effectively creates four 160-bit wide vector registers 344. Thus, as shown in FIG. 3, the register pairs of the FPU 322 are referred to as V0, V1, V2 and V3 and correspond to the physical FPU 332 registers. For instance, FPU 322 physical register 0 is the same as the lower half of the MEU 320 vector register V0. Similarly, FPU 322 physical register 1 is the same as the upper half of MEU 320 vector register V0, while the FPU 322 physical register 7 is the same as the upper half of the MEU 320 vector register V3. Furthermore, in the MEU 320 of FIG. 3, the stack based access model of the 80×87 floating point instructions is not utilized. Instead, the 160-bit registers V0–V3 are partitioned to form vectors of 10-bit or 20-bit data elements.

The output of the vector registers 344 are subsequently provided to an operand router unit (ORU) 346 and the VALU 342. Each vector instruction controls both the ORU 346 and the VALU 342. In combination, the ORU 346 and the VALU 342 allows the processor P to simultaneously execute software using flexible operand routing and multiple operation. Referring to the flow graph of FIG. 7, for example, the VALU 342 operates on the nodes and the ORU 346 implements diagonal interconnections. Thus, because vector arithmetic of different types and data movement can be processed in groups simultaneously, the VALU 342 and the ORU 346 provide high performance The VALU 342 can perform a variety of operations, including addition, subtraction, multiply, multiply/accumulate, shifting and logical functions. The VALU 342 assumes that each of the 160-bit registers 344 is partitioned into 10-bit or 20-bit source operands and destinations. Thus, the VALU 342 can execute 8 or 16 individual operations per instruction. A three-operand instruction format is supported by the VALU 342: source A, source B, and destination registers for each instruction. Additionally, certain operations, such as multiply/accumulate use the destination as an implied third source operand.

The MEU 320 operates primarily in fixed point operation. The difference between fixed point and integer data is the location of the binary point. In the MEU 320, the binary point is assumed to be to the left of the most significant bit. Numbers in the MEU 320 can be considered as fractions that nominally occupy the range from plus 1 to minus 1. The advantage of this format over the integer format is that the numerical magnitude of the data does not grow with each multiply operation as the product of two numbers in the plus 1 to minus 1 ranges yields another number in the plus 1 to the minus 1 range. Therefore, it is less likely the data will need to be rescaled.

The MEU 320 takes advantage of the full 80-bit width of the FPU 322 register set. The MEU 320 loads data from memory in 8-bit or 16-bit quantities, but the data is expanded to 10 bits or 20 bits as it is placed into the vector registers 344 (V0 ... V3). The extended provision provides two benefits: (1) simplifying support for signed and unsigned data; and (2) helping to avoid overflow conditions and round-off errors on intermediate results.

Furthermore, the VALU 342 performs all arithmetic operations using saturating arithmetic. Saturating arithmetic differs from the more familiar modular arithmetic when overflows occur. In modular arithmetic, a positive value that is too large to fit into destination wraps around and becomes very small in value. However, in saturating arithmetic, the maximum representable positive value is substituted for the oversized positive value. This operation is often called clipping.

Additionally, the VALU 342 performs adds, subtracts and Boolean operations on 10-bit to 20-bit quantities. If the result of an add or subtract is outside of the representable range, the result is clipped to the largest positive or negative representable value. However, Boolean operations are not clipped. Furthermore, the result of the add, subtract, and move operations may optionally be shifted right by one bit before being stored to the destination. This scaling can be used to compensate for the tendency of data magnitude to grow with each add or subtract operation. Multiply operations take two 10-bit or 20-bit signed factors and generate a 19-bit or 39-bit signed product. The least significant 9 or 19 bits of the product are rounded and dropped before stored into the 10-bit or 20-bit destination register. As simple multiply operations typically do not overflow, they do not need to be clipped. However, multiply/accumulate operations do require clipping.

Figure 4:
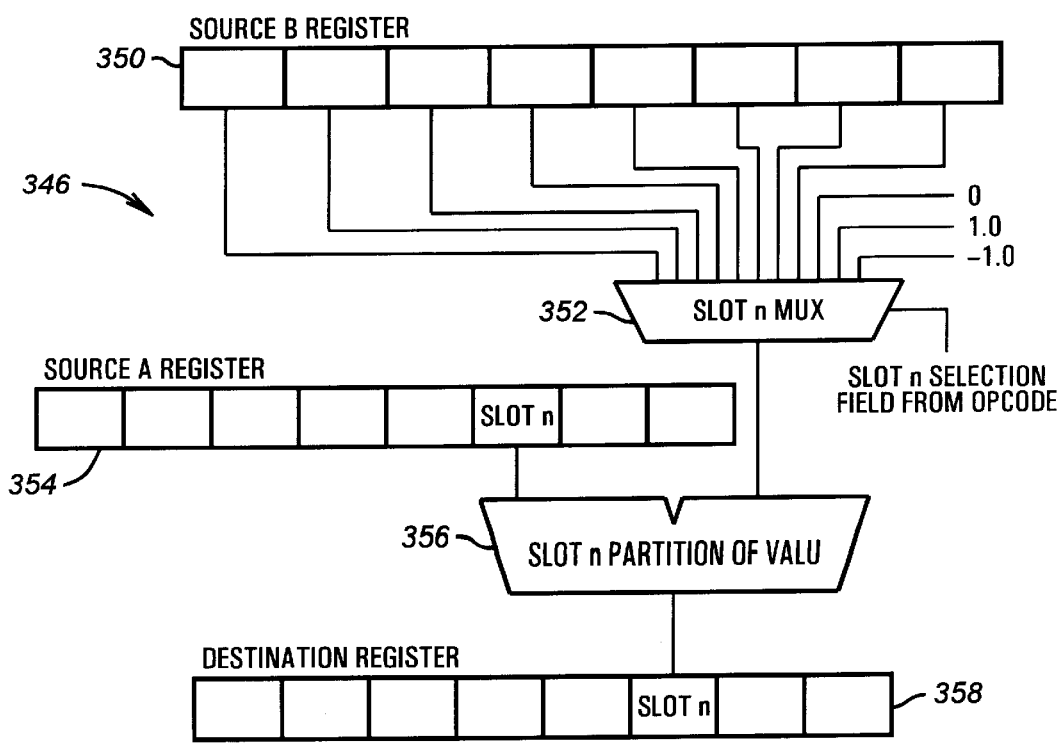
FIG. 4 shows in more detail an operand router unit of FIG. 3.

Turning now to FIG. 4, the details of the operand routing unit 346 are shown. The ORU 346 allows operands to be flexibly moved within and between large 160-bit registers. As vector processors generally must load data from memory in large monolithic chunks, the ability to route operands is useful for the MEU 320. The ability to flexibly access and route individual operands, the ORU 346 provides the ability to "swizzle" the data partitions in a vector register as data moves through it. The swizzling operation allows the operands to be shuffled as needed by the application concurrently with the execution of the vector ALU operations. Thus, a smaller amount of data is required to yield useful results. Thus, the load and store units are less likely to be overloaded, leaving greater bandwidth for the integer, non-vector units to perform work.

As shown in FIG. 4, the ORU 346 is essentially an enhanced 8×8 crossbar switch which works with a plurality of slots. In the preferred embodiment, eight slots are provided for each of a source B register 350, source A register 354 and a destination register 358. The source B register 350 is connected to a multiplexer 352. The output of the multiplexer 352 and the source A register 354 is provided to a VALU partition 356. The VALU partition 356 in turn is connected to the destination register 358.

In the vector source B register 350, each slot contains either one 20-bit partition or two 10-bit partitions, depending on the partition width as specified in the vector instruction. For 10-bit partitions, the MEU 320 simultaneously performs independent but identical operations on the two partitions in a slot. Furthermore, each slot in the destination register 358 can independently receive one of eleven values: the value in one of the eight source slots 350 and 354, a Z value (0), a P value (1) or an N value (−1). During the execution of codes by the MEU 320, all vector instructions use a single opcode format that simultaneously controls the VALU 342 and the ORU 346. This format is approximately eight bytes long. Each instruction encodes the two source registers, the destination register, the partition size, and the operations to be performed on each partition. In addition, each instruction encodes the ORU 346 routing settings for each of the eight slots. Normally, any two of the vector operations defined in the following table may be specified in a single vector instruction. Each slot can be arbitrarily assigned either of the two operations. The vector instructions offered by the MEU 320 is shown in Tables 1 and 2, as follows:

TABLE 1

Vector Operation Descriptions

| Category | Mnemonic | Description |
| --- | --- | --- |
| Add | add add_ | Add sourceA and sourceB partitions, place sum in destination. add arithmetically shifts the result right by one bit (computes average). |
| Subtract | sub sub_ sbr sbr_ | Subtract partitions. sub does sourceA − source B; sbr does source B − source A. sub_ and sbr_ arithmetically shift the result right by one bit. |
| Accumulate/ Merge | acum acum_ | Add the contents of the destination register partition to the sourceB partition and place the sum in the destination. acum_ arithmetically shift the result right by one bit. |
| Negate | neg | Negate sourceB partition and place in destination. |
| Distance | dist | Subtract partitions then perform |

TABLE 1-continued

Vector Operation Descriptions

| Category | Mnemonic | Description |
|---|---|---|
| Multiply | mul mac | absolute value. mul multiplies the sourceA partition by the sourceB partition and places the product in the destination. mac multiplies sourceA by source B and adds the product to the destination. |
| Conditional Move Scale | mvz mvnz mvgez mvlz asr n asl n | Conditionally move partition in sourceB register to partition in destination register depending on sourceA partition's relationship to zero. Arithmetically shifts the operand in sourceB by amount n. N can be between 1 and 4 inclusive. asl uses saturating arithmetic and shifts zeros in from the right. asr copies the sign bit from the left. |
| Logical Shift | lsr n lsl n | Logically shifts the operand in sourceB by amount n. N can be between 1 and 4 inclusive. Zeros are shifted in from the left or right. lsl uses modulo arithmetic; it does not clip. |
| Boolean | false nor bnota nota anotb notb xor nand and nxor b borna a aornb or true | Perform one of sixteen possible Boolean operations between sourceA and sourceB partitions. (The operations are listed in order of their canonical truth table representations.) |
| Round | rnd n | Add the constant (1*LSb<<n-1) to sourceB, then zero out the n lowest bits. n can be between 1 and 4 inclusive. Implements "round-to-even" method: If (sourceB<n:0> == 010...0), then don't do the add. |
| Magnitude Check | mag | This operation can be used to implement block floating point algorithms. If the number in sourceB has fewer consecutive leading 1's or 0's than the number in sourceA, then sourceB is placed in the destination; otherwise sourceA is placed in the destination. Only the eight leftmost bits of the values are used in the comparison; if both sourceA and sourceB start with a run of more than 7 bits, then the result is the value from sourceA. This operation is an approximation of the "C" statement: (abs(sourceA) <= abs(sourceB)) ? sourceA : source B. |
| SourceA Partition Shift | pshra | For each slot s, copy the contents of slot s+1 from the sourceA register to slot s in the destination register. (If this operation is used in slot 7, then the result is immediate zero). This operation can be used to efficiently shift data inputs and outputs during convolutions (FIR filters, etc.). |
| Slot Routing | blbh ahbh albl | These operations are defined only for 20-bit partitions. They are used to route 10-bit data across the even/odd "boundary" that the ORU doesn't cross. blbh swaps the upper and lower halves of the sourceB operand and places the result in the destination. ahbh concatenates the upper half of the sourceA with the upper half of sourceB. albl concatenates the lower half of sourceA with the lower half of sourceB. |
| Store Conversion | ws2u | This operation is used prior to storing 16-bit unsigned data from a 20-bit partition. If bit 19 of sourceB is set, the destination is set to zero. Otherwise, this operation is the same as lsl 1. |
| Extended-Precision | emach emacl emaci carry | These operations are used to perform multiply-and-accumulate functions while retaining 36 bits of precision in intermediate results; they are only defined for 20-bit partitions. emach is the same as mac, except that no rounding is done on the LSb. emacl multiplies sourceA and sourceB, then adds bits <18:3> of the 39-bit intermediate product to bits <15:0> of the destination, propagating carries through bit 19 of the destination. emaci is similar to emacl, except that bits <19:16> of the destination are cleared prior to the summation. The carry operation logically shifts sourceB right by 16 bits, then adds the result to SourceA. |

TABLE 2

Operation Synonyms

| Category | Alias Name | Actual Operation | Description |
|---|---|---|---|
| Move SourceB | mov mov_ | b asrl | Move the sourceB register partition to the destination partition. mov_ arithmetically shifts the results right by one bit. |
| Move SourceA | mova | a | Copy the partition in sourceA to the destination. |
| SourceA Absolute Value | absa | dist (. . Z . .) | Compute the absolute value of the sourceA partition. |
| Unmodified Destination | dest | acum (. . Z . .) | Leave the destination partition unchanged. |
| Average | avg | add_ | Compute average of two values. |

Turning now to load and store instructions, each type of operation has two versions: one that moves 16 bytes of memory and one that moves 8 bytes of memory. The 8-byte versions are defined because this is often the amount of data needed; loading or storing 16 bytes in these cases would be wasteful. Further, the 8-byte loads and stores can be used to convert between byte-precision data and word-precision data. The 16-byte loads and stores operate on the entire 160-bit vector register. The 8-byte stores for 20-bit partitions store only the values from slots 4 through 7. The 8-byte stores for 10-bit partitions store only the upper half of each of the eight slots. The 8-byte loads for 20-bit partitions load the memory data to slots 4 through 7; slots 0 through 3 are set to zero. The 8-byte loads for 10-bit partitions load the memory data to the upper half of each slot; the lower half of each slot is set to zero. Even though 8-byte loads only copy memory to half of the bits in a vector register, the entire 160-bit vector register is updated by padding the unused partitions with zeros. This feature greatly simplifies the implementation of register renaming for the MEU because partial register updates do not occur. Table 3 illustrates the load and store instructions in more detail:

TABLE 3

Load and Store Instruction Descriptions

| Instruction Type | Mnemonic Format | Description |
| --- | --- | --- |
| 16-Byte, 20-Bit Load | vldw vd, mem128 | Load destination register vd with 16 bytes of signed 16-bit data at address mem128. |
| 8-Byte, 20-Bit Load | vldw vdh, mem64 | Load slots 4 through 7 of destination register vd with 8 bytes of signed 16-bit data at address mem64. Set slots 0 through 3 of vd to zero. |
| 16-Byte, 10-Bit Load | vldb vd, meml 28 | Load destination register vd with 16 bytes of unsigned 8-bit data at address mem128. Data is loaded using a 2:1 byte interleave pattern. |
| 16-Byte, 10-Bit Load | vldb vdh, mem64 | Load destination register vd with 8 bytes of unsigned 8-bit data at address mem64; The upper half of each slot receives the memory values; the lower half of each slot is set to zero. |
| 16-Byte, 20-Bit Store | vstw mem 128, vs | Store source register vs to 16 bytes of signed 16-bit data at address mem128. |
| 8-Byte, 20-Bit Store | vstw mem64, vsh | Store slots 4 through 7 of source register vs to 8 bytes of signed 16-bit dat at address mem64. |
| 16-Byte, 10-Bit Store | vstb mem128, vs | Store source register vs to 16 bytes of unsigned 8-bit data at address mem128. Data is stored using a 2:1 interleave pattern. |
| 16-Byte, 10-Bit Store | vstb mem64, vsh | Store source register vs to 8 bytes of unsigned 8-bit data at address mem64. The upper half of each slot is stored to memory; the lower half of each slot is ignored. |

The mnemonics for the vector instruction need to specify the operations to perform on each partition as well as the sources, destination and ORU routing. This is notated as follows:

{sbr sbr add add sbr add sbr add} word V3, V2, V1(37P3Z1N2)

This instruction performs adds and reverse subtracts. V3 is the destination; V2 is sourceA; V1 is sourceB. The slots for the operand specifier and the routing specifier are laid out in decreasing order from left to right.; slot 7 and 6 get sbr, slot 5 gets add, and so forth. The "word" symbol specifies that the instruction works on a 20-bit partitions. The routing specifier for sourceB is set for the following (the number after the points specify slot numbers):

dest.7 <== −sourceA.7+sourceB.3
dest.6 <== −sourceA.6+sourceB.7
dest.5 <== sourceA.5+#1.0
dest.4 <== sourceA.4+sourceB.3
dest.3 <== −sourceA.3+#0.0
dest.2 <== sourceA.2+sourceB.1
dest.1 <== −sourceA.1+#−1.0
dest.0 <== sourceA.0 +sourceB.2

Before turning to the details of the implementation of Bresenham's line drawing algorithm on a multimedia extension unit, an understanding of Bresenham's line drawing algorithm in general is helpful. Bresenham's line drawing algorithm calculates integral coordinates for a line using only integer math. That is, even though a real line has particular y values that may be fractional for a particular x value, Bresenham's algorithm calculates an appropriate integral line fit using no fractional math. It does so effectively by determining whether a particular real y value for a particular x value would be closer to the present y value or to the next incremented y value. It bases all subsequent calculations on the presently calculated y value and a corresponding error term, both integers.

Figure 5:
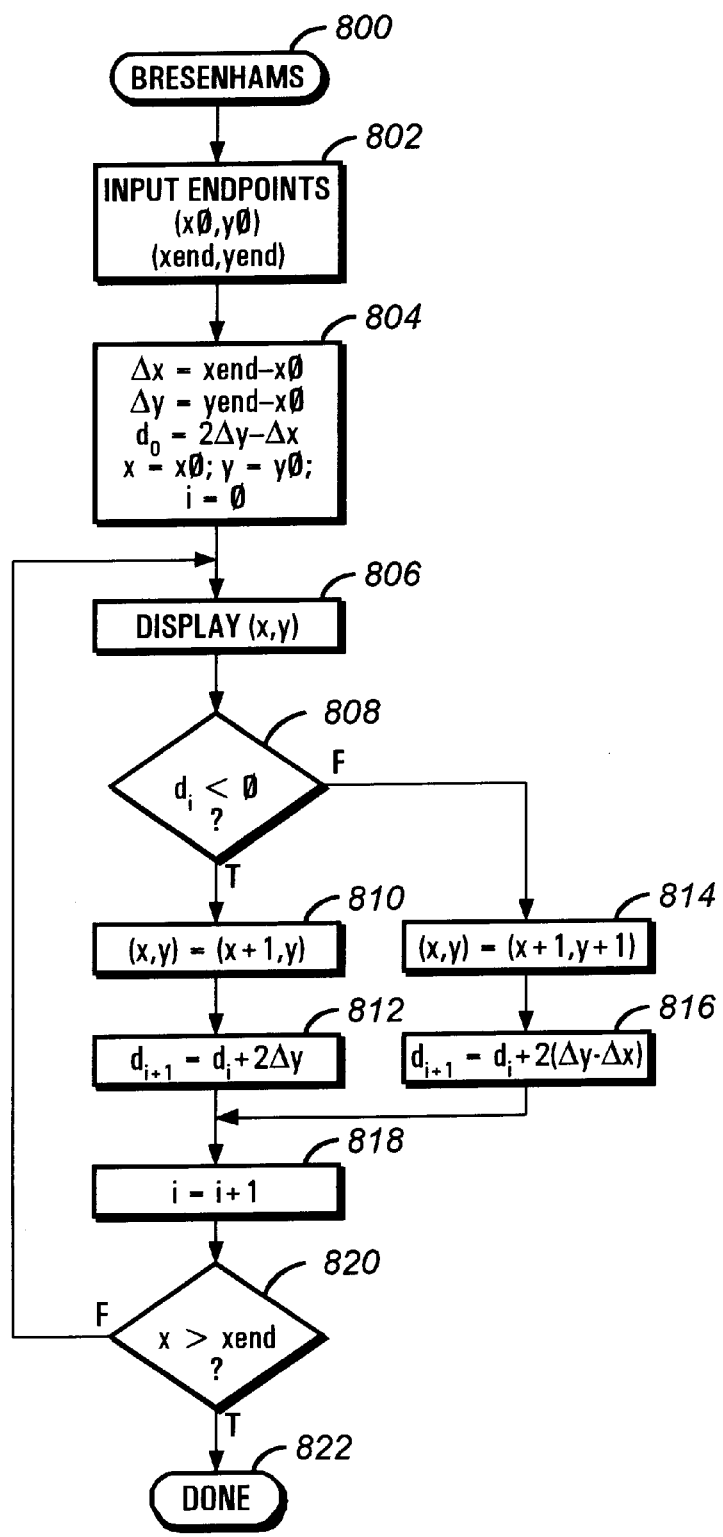
FIG. 5 is an illustration of a serially executed Bresenham line drawing routine according to the prior art.

Referring to FIG. 5, shown is a flowchart illustrating a typical implementation of Bresenham's algorithm. A routine BRESENHAM 800 begins at step 802, where the end points of the line to be drawn are provided as coordinates (x0, y0) and (xend, yend). This particular implementation draws lines in the first quadrant and with a slope of less than one, although the algorithm is easily adapted to other quadrants and slopes.

Proceeding to step 804, a delta x value $\Delta x$ is set to xend-x0, a delta y value $\Delta y$ is set to yend-y0, an error parameter $d_0$ is set to $2\Delta y - \Delta x$, x is set to x0, y is set to y0, and an iteration counter i is set to zero. Proceeding to step 806, the current pixels corresponding to the coordinate (x,y) are displayed on the display screen. Proceeding to step 808, di is compared to zero. On this first pass, $d_i$ equals $d_0$, which in turn is equal to $2\Delta y - \Delta x$. This comparison determines whether the next integral pixel should have its y value remain the same or be incremented by one. If $d_i$ is less than zero, this indicates the real value for y (i.e., in a non-integral line) is closer to the present integral y value rather than the next integral value for y. Therefore, control proceeds to step 810, where the coordinates (x,y) are set equal to (x+1,y), maintaining y at its present integral value. Control then proceeds to step 812, where a next error, or remainder, value $d_{i+1}$ is calculated to be $d_i + 2\Delta y$. If instead at step 808, $d_i$ is greater than or equal to zero at step 808, the real value for y is closer to the next integral value for y rather than the present y value. Control therefore proceeds to step 814, where y is incremented, that is, (x,y) is set equal to (x+1, y+1). Control then proceeds to step 816 where the next error value $d_{i+1}$ is set equal to $d_i + 2(\Delta y - \Delta x)$. Of note, in both cases from step 808, the value of the next error $d_{i+1}$ is dependent on the previous value $d_i$.

From steps 812 and 816, control proceeds to step 818, where i is incremented. Control then proceeds to step 820, where x is compared with xend. If x has not exceeded xend, control loops to step 806, where a pixel corresponding to (x,y) is displayed and the loop is repeated. If at step 820 x has exceeded xend, the line has been completed, so control proceeds to step 822, where the routine is done.

An advantage of Bresenham's algorithm is that it only requires integer addition and substraction. Further, the values of $2\Delta y$ used in step 812 and $2(\Delta y - \Delta x)$ in step 816 can be calculated at the beginning of the loop, such as at step 804, rather than during each iteration. Thus, this algorithm is highly efficient. But as is appreciated from steps 812 and 816, it is also a serial algorithm, where each value $d_{i+1}$ and $y_{i+1}$ are dependent on the immediately preceding values of $d_i$ and $y_i$.

Figure 6A:
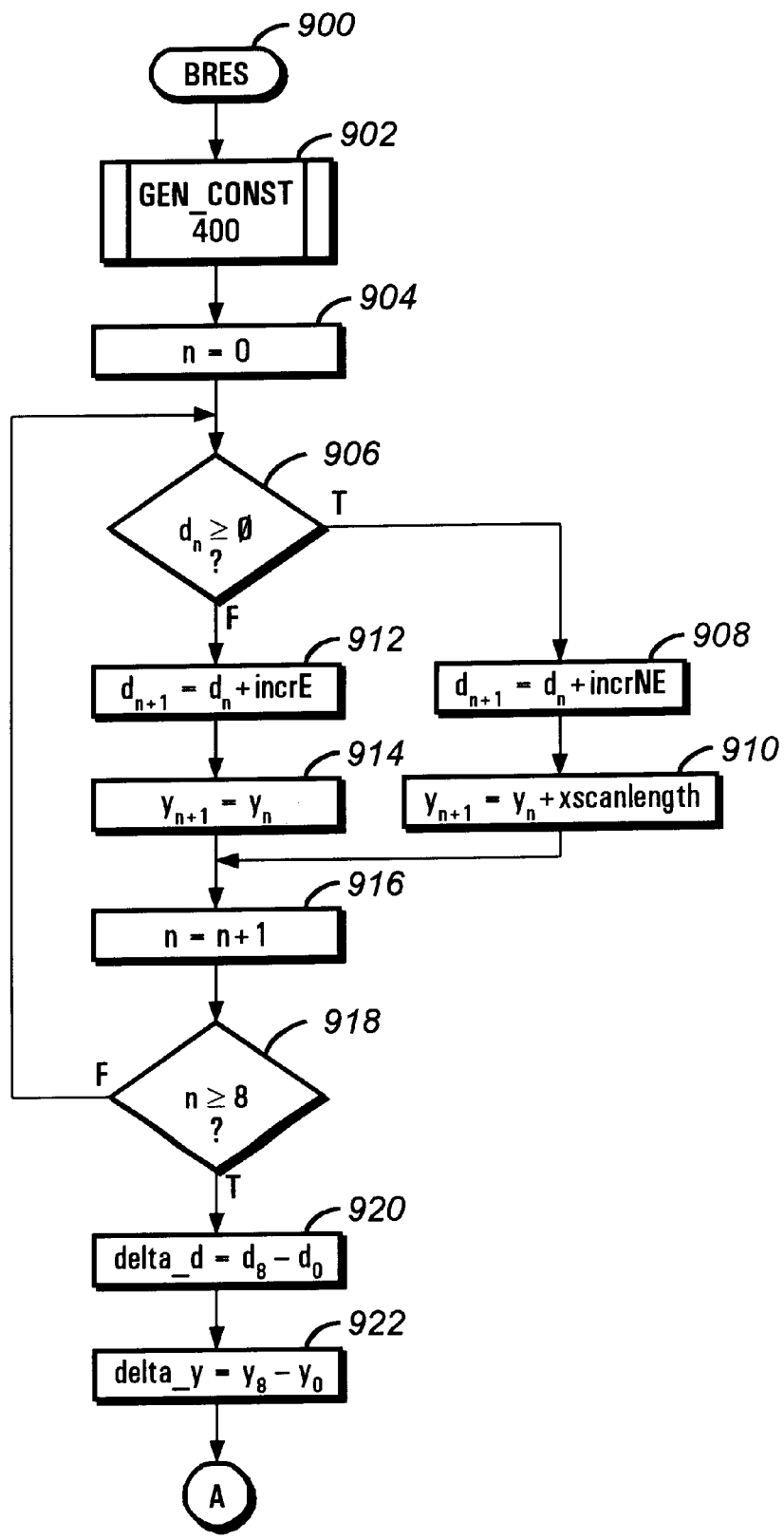
FIGS. 6A–B are a flowchart illustration of a Bresenham line drawing routine for execution on a routable operand and multiple operation vector processor for line drawing according to the invention.
Figure 6B:
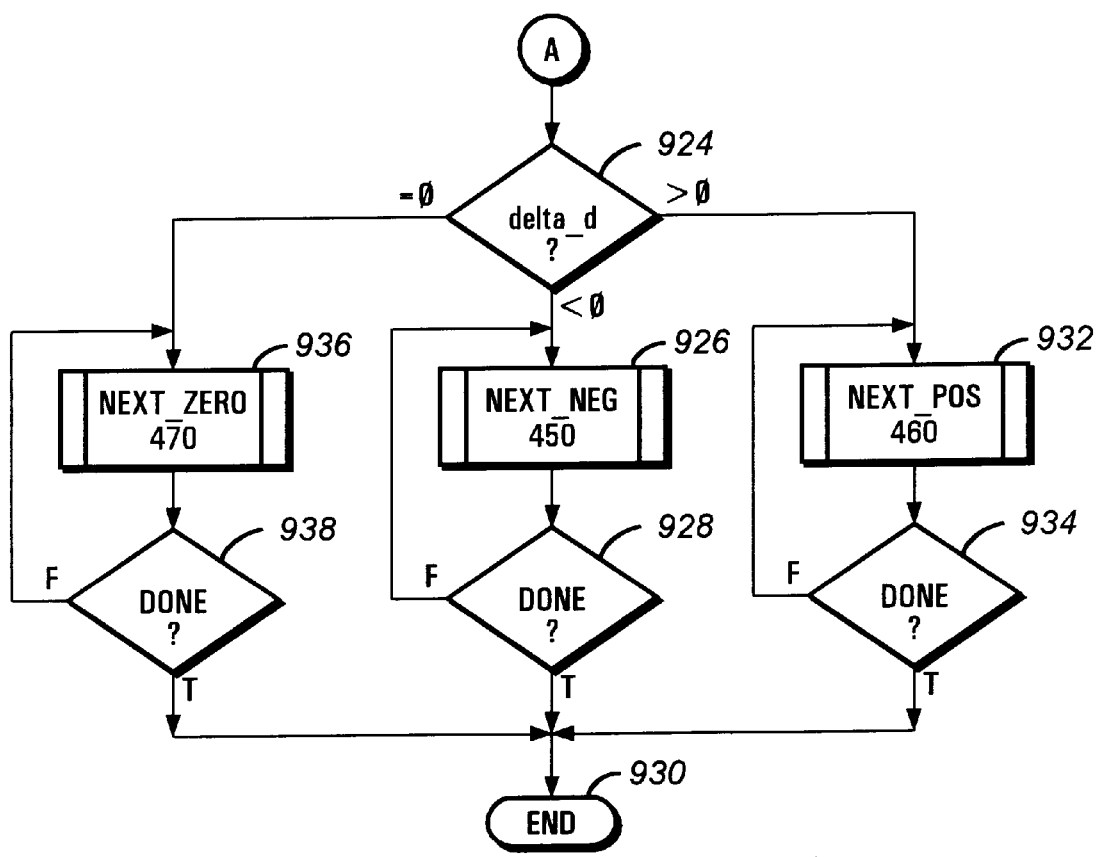

Turning to FIGS. 6A and 6B, illustrated is a flowchart of a parallel Bresenham routine BRES 900 according to the invention. This routine 900 is found in source code Appendix A, and includes a mixture of standard 80X86 operations in conjunction with parallel operations for execution on a multimedia extension unit. Beginning at step 902, a generate constants routine GEN_CONST 400 is executed, which is a series of instructions rather than a subroutine.

Figure 7:
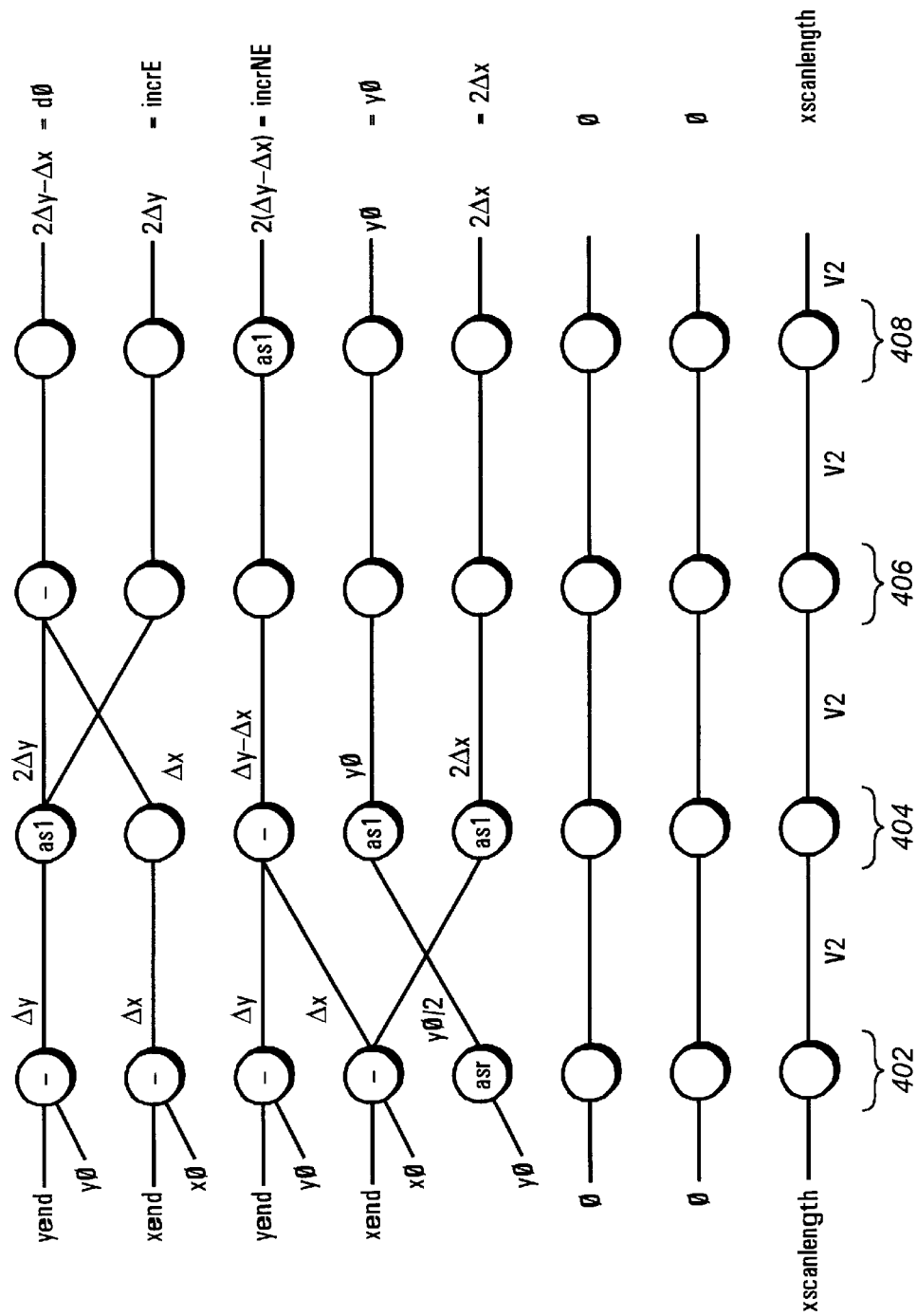
FIG. 7 is a parallel execution diagram illustrating the operand routing and multiple operation capability of software implemented according to the invention.

The GEN_CONST routine 400 sets the initial d value ($d_0$, or d0) to $2\Delta y - \Delta x$. A d-increment-if-equal value incrE is set to $2\Delta y$ (this corresponds to the increment of step 812). A d-increment-if-not-equal value incrNE is set to $2(\Delta y - \Delta x)$ (this corresponds to the increment of step 816). Finally, $2\Delta x$ is calculated. This routine 400, further described below in conjunction with FIG. 7, illustrates how the multimedia extension unit can be employed to simultaneously perform different, unrelated operations. Although not directly related to the parallel calculation of appropriate points on a line, the GEN_CONST routine 400 does illustrate other aspects and features of parallel execution according to the invention.

The BRES routine 900 employs a parallel algorithm to simultaneously calculate a sequence of integral y values that correspond to integral x values in a drawn line. This particular BRES routine 900 is specifically adapted to generate a line in the first quadrant with a slope of less than one. It can be easily adapted for other quadrants and other slopes.

As is clear from FIG. 5, the generation of each new integral y value was dependent on the previously calculated values of $d_i$. That is, historically Bresenham's algorithm has been a serial algorithm. According to the invention, however, a technique is used such that Bresenham's algorithm is implemented in parallel so that a plurality of new integral x and y values can be generated simultaneously. This is effectively done by calculating in parallel a sequence of $d_i$ values, and then calculating in parallel a corresponding sequence of $y_i$ values.

Before proceeding to the parallel calculation of sequences of $d_i$ and $y_i$ values, the BRES routine 900 generates an initial sequence of $d_i$ and $y_i$ values in series. In the disclosed embodiment, eight $d_i$ and $y_i$ values are ultimately calculated in parallel, so initially the BRES routine 900 calculates nine initial $d_i$ and $y_i$ values.

Beginning at step 904, the routine 900 sets a loop variable n to zero and enters a loop at step 906. At step 906, it is determined whether $d_n$ (on this first path $d_0$, which equals $2\Delta y - \Delta x$) is greater than or equal to zero.

At step 906, if $d_n$ (here $d_0$) is greater than or equal to zero, this indicates the next corresponding $y_{n+1}$ value (here $y_1$) should be incremented from the previous y (here $y_0$) value (see step 814), and indicates the next $d_{n+1}$ value (here $d_1$) should be incremented by the incrNE value of $2(\Delta y - \Delta x)$, (see step 816). Therefore, if $d_n$ is greater than or equal to zero through this first loop at step 906, control proceeds to step 908, where $d_{n+1}$ (here $d_1$) is set equal to $d_0 + 2(\Delta y - \Delta x)$. Control then proceeds to step 910, where $y_1$ is set equal to $y_0$+ xscanlength. The value xscanlength can be presumed to be 1 for simplicity, but actually corresponds to the "row width" in memory. That is, one skilled in digital video manipulation will understand that given an x-y pixel map in memory, pixels vertically above or below a given x axis pixel are actually displaced in memory by one row width of memory locations. Conceptually, however, assuming xscanlength to be one yields the correct logical result, where the physical mapping in memory is discounted. Therefore, for simplicity, xscanlength is assumed to be one for the remainder of this discussion.

From step 906, if $d_n$ (here $d_o$) is less than zero, this indicates the new $y_{n+1}$ value (here, $y_1$) should be the same as the previous $y_n$ (here $y_0$) so control proceeds to step 912, where $d_1$ is set equal to $d_0 + 2\Delta y$, and then to step 914, where $y_i$ is set equal to $y_0$.

From both steps 914 and step 910, control proceeds to step 916, where n is incremented, and then to step 918 to determine whether n is greater than 8. If not true, then the first nine $d_i$ values and first nine $y_i$ values have not been calculated, so control loops to step 906 for the next $d_n$ and $y_n$. If n is greater than 8 at step 918, control proceeds to step 920. At step 920, a value delta_d is calculated to be the difference between $d_8$ and $d_0$. Proceeding to step 922, a value delta_y is similarly calculated to be $y_8-y_0$. Delta_d and delta_y are appropriate increment values for every eighth $d_i$ and $y_i$ value. This will be further understood in conjunction with FIGS. 8A–9D below.

Control then proceeds to step 924, where it is determined whether delta_d is greater than zero, less than zero, or equal to zero. If delta_d is equal to zero, the slope of the line results in every eighth $y_i$ value being exact. That is, the real value of y would equal the corresponding integer value of y for $y_8$, $y_{16}$, etc. In this case, the next eight values of $y_i$ are simply the previous eight values of $y_i$ with an appropriate offset added. This results in a high speed calculation of the subsequent values of $y_i$ without the necessity of calculating new values of $d_i$ for each of the values of $y_i$.

If delta_d is less than zero, then the slope causes the real line to fall below the appropriate $y_i$ pixel at $y_8$, $y_{16}$, etc. That is, $y_0$ may be exact, but the integer value determined for $y_8$ is slightly greater than where a real line would fall. Similarly, if delta_$_d$ is greater than zero, then the slope of the line is slightly greater than every eighth value of $y_i$.

For example, suppose delta_y equal 5, indicating that for every eight values of x, y is incremented by 5. If delta_d equals zero, then the slope is exactly ⅝, $\Delta y$ is exact, and every eighth $y_i$ value falls exactly on a real line. If delta_d is less than zero, the actual line falls below the integral eighth value of $y_i$. Similarly, if delta_d is greater than zero, then the line slope is greater than ⅝, and the actual line falls slightly above the integral eighth value of $y_i$. The largest that delta_d can reach in magnitude is $\Delta x$. That would correspond to a line whose slope falls exactly between integral y values at the eighth value of x. For example, a slope of $11/16$ would have a delta_d equal to eight.

To find eight successive values of $d_i$ and $y_i$, delta_d and delta_y are added to the previous eight values of $d_i$ and $y_i$. If this action causes a particular $d_i$ to violate the following boundary condition:

$$incrNE \leq d_i < incrE$$

$$2(\Delta y - \Delta x) \leq d_i < 2\Delta y$$

then $2\Delta x$ is added to or subtracted from $d_i$ and the corresponding $y_i$ is shifted accordingly. That is, if $2\Delta x$ is subtracted from $d_i$, then $y_i$ must be incremented by 1. If $2\Delta x$ is added to $d_i$, $y_i$ must be decremented by 1.

Proceeding first to the condition in which delta_d is less than zero, control proceeds to step 926. Step 926 is a series of vector instructions NEXT_NEG 450, which calculates the next eight values of $d_i$ and $y_i$ given a negative delta_d. This series of instructions is described below in conjunction with FIGS. 8A–8E. After this series of instructions has executed, the next eight values of $y_i$ and $d_i$ have been calculated, so control proceeds to step 928. If at step 928 it is determined that all of the required $y_i$ values have been calculated, then control proceeds to step 930, the end of the routine, where return is executed to whatever routine called the BRES routine 900. This could be a line drawing routine, for example. If at step 928 additional values need to be calculated for $y_i$, however, control loops to step 926.

If at step 924 delta_d is positive, then control proceeds instead to step 932, where a NEXT_POS 460 series of vector instructions are executed, further described below in conjunction with FIGS. 9A–9D. Control then proceeds to step 934, and, as with steps 926 and 928, control either proceeds to step 930 where the routine ends or back to step 932 for the next eight values of $y_i$ and $d_i$.

If delta_d at step 924 is equal to zero, control instead proceeds to step 936, where a series of instructions NEXT_ZERO 470 are executed, described below in conjunction with FIG. 10, calculating the next eight $y_i$ values. Control then proceeds to step 938, where if the necessary values of $y_i$ have been calculated, control proceeds to step 930 where the routine ends, or if the values have not been calculated, control loops to step 936 for the next eight values of $y_i$.

Parallel Constant Generation

Turning to the generate constant series of instructions GEN_CONST 400, the vector implementation of these instructions on the multimedia extension unit is illustrated in FIG. 7. Each instruction is shown as an instruction 402–408, and the corresponding instructions are noted in the source code Appendix A. Beginning at instruction 402, vectors V1 and V0 are operated on to yield a vector V2. Initially, the vectors contain:

$$v0 = \{dc, dc, dc, dc, dc, dc, x_0, y_0\}$$

$$v1 = \{yend, xend, yend, xend, dc, dc, dc, xscanlength\}$$

(where dc means "don't care")

Beginning at instruction 402, $y_0$ is subtracted from yend yielding $\Delta y$ in V2.7, $x_0$ is subtracted from xend yielding $\Delta x$ in V2.6, and this is repeated to yield $\Delta y$ and $\Delta x$ in V2.5 and V2.4. Further, $y_0$ is arithmetically shifted right, yielding $y_0/2$ in V2.3. This instruction is an example of how different vector elements can be independently routed and now different operations can be applied to those independently routed values.

Proceeding to instruction 404, $\Delta y$ is arithmetically shifted left yielding $2\Delta y$, $\Delta x$ is carried forward, $\Delta x$ is subtracted from $\Delta y$ yielding $\Delta y - \Delta x$, and $y_0/2$ is arithmetically shifted left to yield a rounded $y_0$ value, and $\Delta x$ is arithmetically shifted left to yield $2\Delta x$. These resulting values are placed in V2. Proceeding to instruction 406, $\Delta x$ is subtracted from $2\Delta y$, $2\Delta y$ is carried forward, $\Delta y - \Delta x$ is carried forward, $y_0$ is carried forward, and $2\Delta x$ is carried forward, all again being placed in V2.

Finally, in instruction 408, all values are carried forward except $\Delta y - \Delta x$, which is arithmetically shifted left to yield $2(\Delta y - \Delta x)$. All of these results are placed in V2. As a result of the instructions of 402–408, V2.7 contains $d_0$, which is equal to $2\Delta y - \Delta x$; V2.6 contains incrE, the increment to be used if $y_i$ has remained the same, which is equal to $2\Delta y$; V2.5 contains incrNE, which is $2(\Delta y - \Delta x)$; V2.4 contains $y_0$ with its lowest bit reset to 0; V2.3 contains $2\Delta x$; and V2.0 contains xscanlength. Thus, a series of very dissimilar instructions and values have been simultaneously calculated using the routing and operation assignment of the multimedia extension unit as described in the incorporated applications.

Parallel Generation of Pixel Values

Turning to FIGS. 8A–8E, illustrated are the instructions NEXT_NEG 450. To understand the operation of the NEXT_NEG 450 series of instructions, reference is made to FIGS. 8A–8E in conjunction with the source code Appendix A. These instructions are shown as a series of operations 500–518, which together generate the next eight values of $y_i$ and the next eight values of $d_i$. Referring first to instruction 500 (FIG. 6A), on entry, the first eight values of $d_i$ are known and held in V1.

In the figures, the actual multimedia extension unit register holding the values before and after the instruction are also shown for convenience. In instruction 500, $\{d_7 \ldots d_0\}$ held in V1, are simultaneously added to the scaler delta_d, held in V3.7. This results in eight intermediate d values $\{d'_{15} \ldots d'_8\}$ held in V1. So at this point, each initial $d_i$ value has added to it delta_d, which, as discussed above, is equal to $d_8 - d_0$, or the change of $d_n$ over eight values. The intermediate values $\{d'_{15} \ldots d'_8\}$ are not the final values of $\{d_{15} \ldots d_8\}$, because they may exceed the boundary conditions discussed above. Therefore, these values, denoted as a vector V_d'[7 ... 0] are manipulated in FIG. 6B to yield appropriate correction values. The appropriate correction values are then returned for processing in instruction 518, where V_d'[7 ... 0] is added to a correction vector V_2$\Delta$x[7 ... 0] from FIG. 8B. This results in the final values of $\{d_{15} \ldots d_8\}$. The effect of adding the vector V_2$\Delta$x[7 ... 0] is that if any of the intermediate values $\{d'_{15} \ldots d'_8\}$ is less than $2(\Delta y - \Delta x)$ and exceeds the lower boundary condition, then the $d'_i$ value is incremented by $2\Delta x$, and the corresponding $y_i$ is decremented by xscanlength (see FIG. 8E, instruction 512).

Figure 8A:
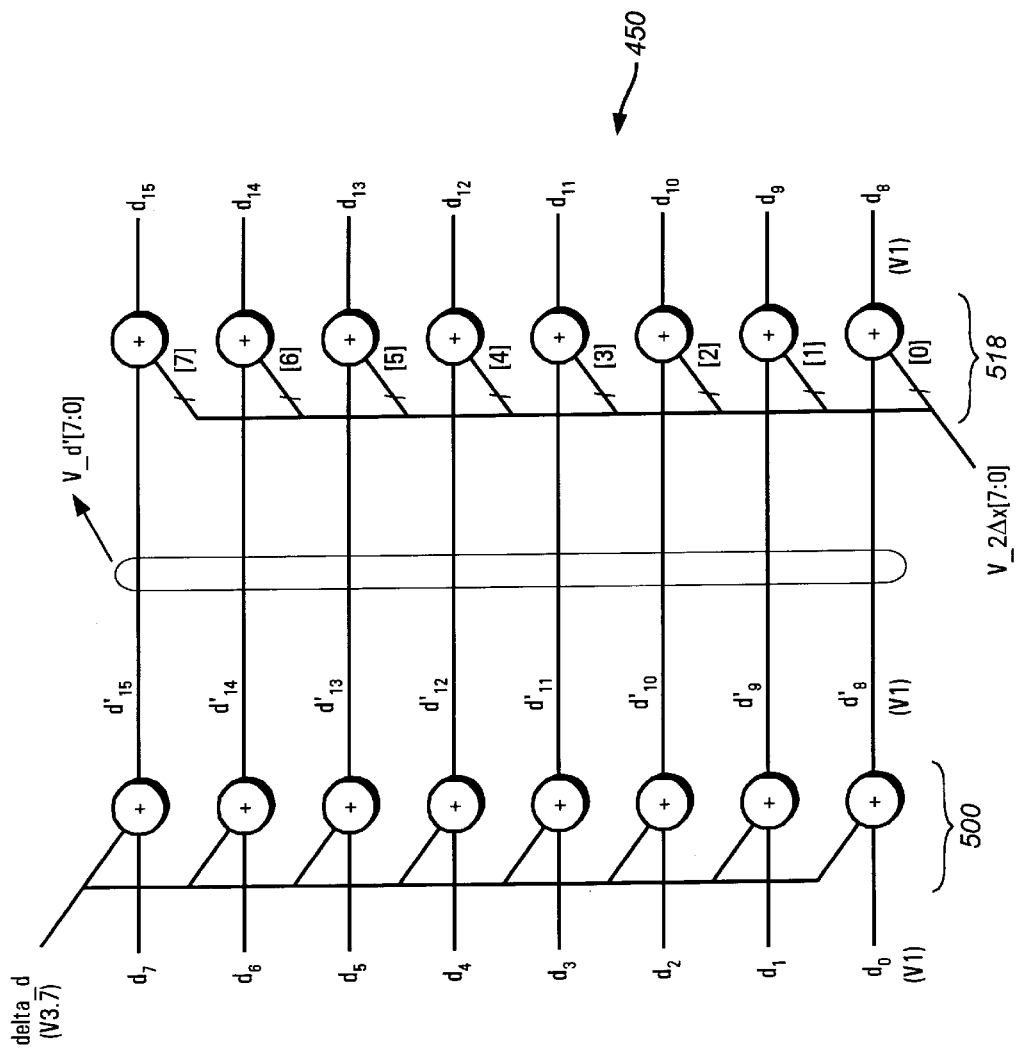
FIGS. 8A–E are parallel execution diagrams showing the parallel generation of sequential points on a line according to the invention.
Figure 8B:
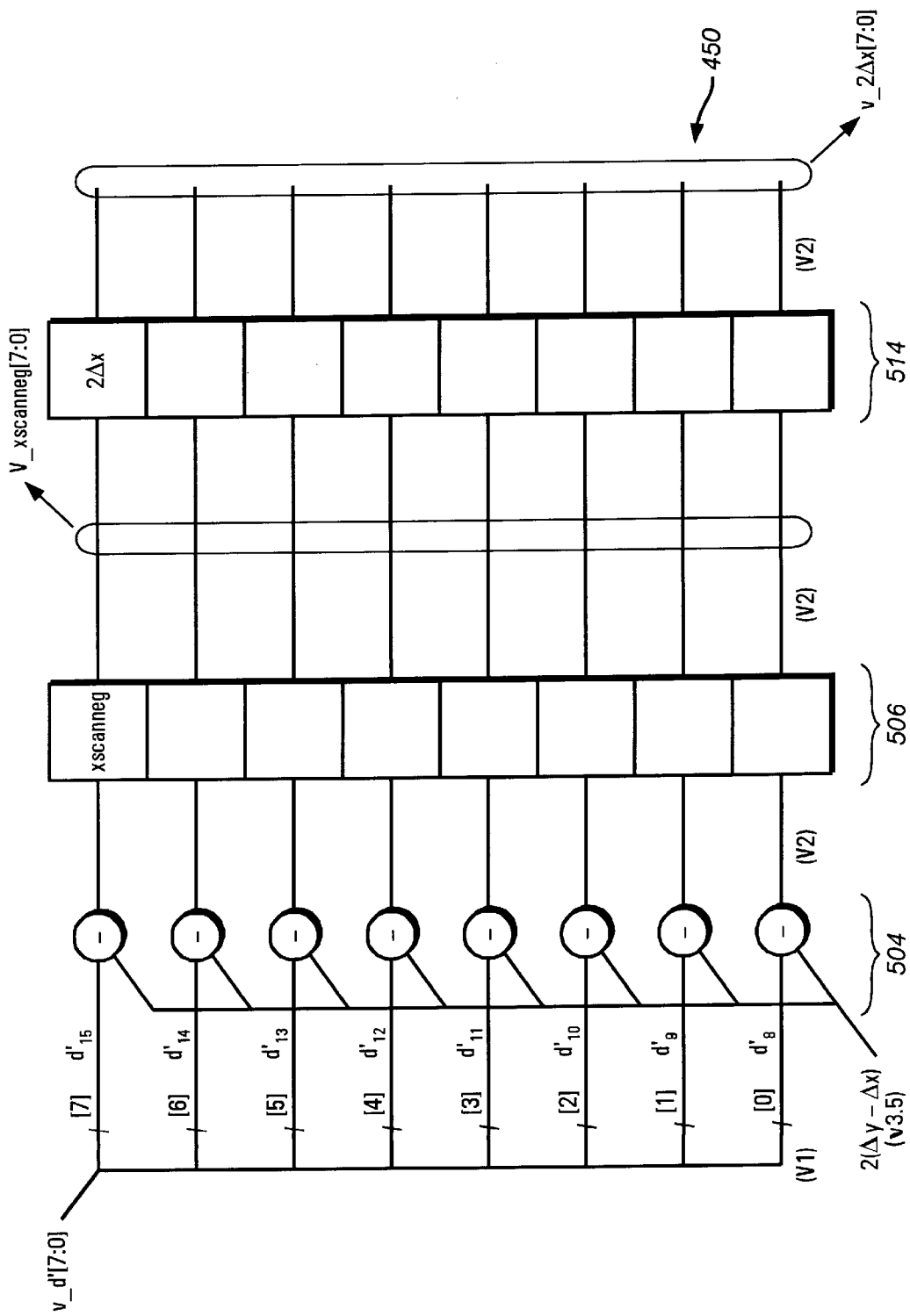
Figure 8C:
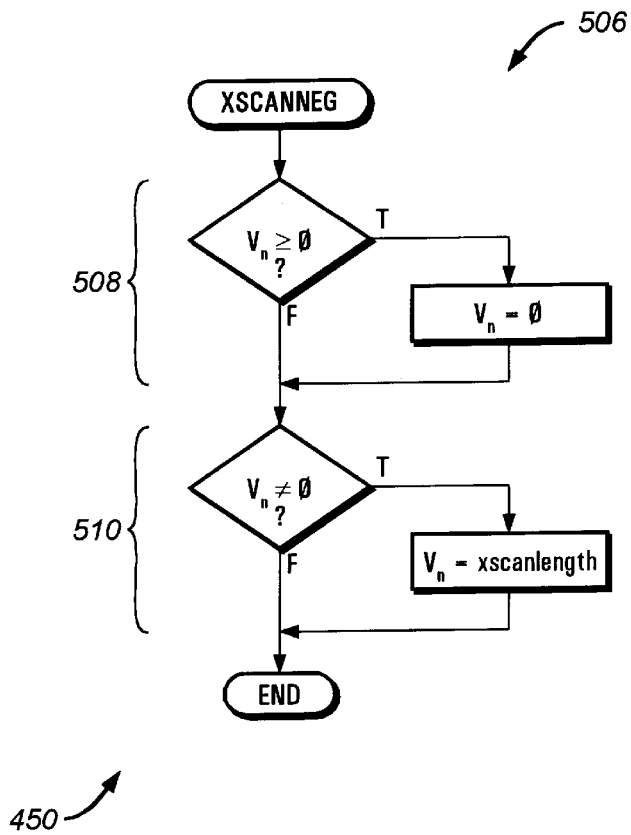

To generate the appropriate correction values for both the $d'_i$ and the $y'_i$, the V_d'[7 ... 0] vector (held in the register V1) is manipulated in FIG. 8B. At instruction 504, the scaler $2(\Delta y - \Delta x)$, or incrNE, is subtracted from each of $\{d'_{15} \ldots d'_8\}$. The resulting values are then altered in an XSCAN-NEG 506 series of instructions, illustrated in FIG. 8C. Turning to that figure, illustrated is a flowchart of what is effectively a series of comparison and assignment instructions executed in parallel on each vector element of the vector register being operated on, here V2. This is illustrated as a flowchart for simplicity, but it must be understood that this "flowchart" is simultaneously executed for each of the vector elements. For each element of the vector resulting from the instruction 504, $v_n$ is compared to zero, and if greater than or equal to zero, is loaded with zero. Then, at instruction 510, for each vector element $v_n$ that is not equal to zero, that element $v_n$ is loaded with xscanlength. The result of this series of instructions is a vector V_xscanneg[7 ... 0] (see FIG. 8B). For each d' value in V2 before the instruction 504, if that value is less than $2(\Delta y - \Delta x)$, then the corresponding element of V_xscanneg[7 ... 0] now contains the value xscanlength. Otherwise, the corresponding element of V_xcanneg [7 ... 0] contains zero. These values are then used by instruction 512 of FIG. 8E to adjust the $y_1$ values.

Figure 8D:
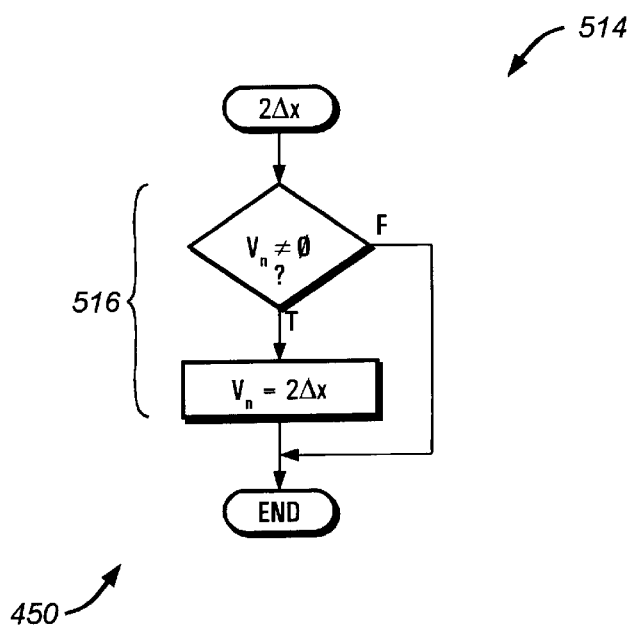
Figure 8E:
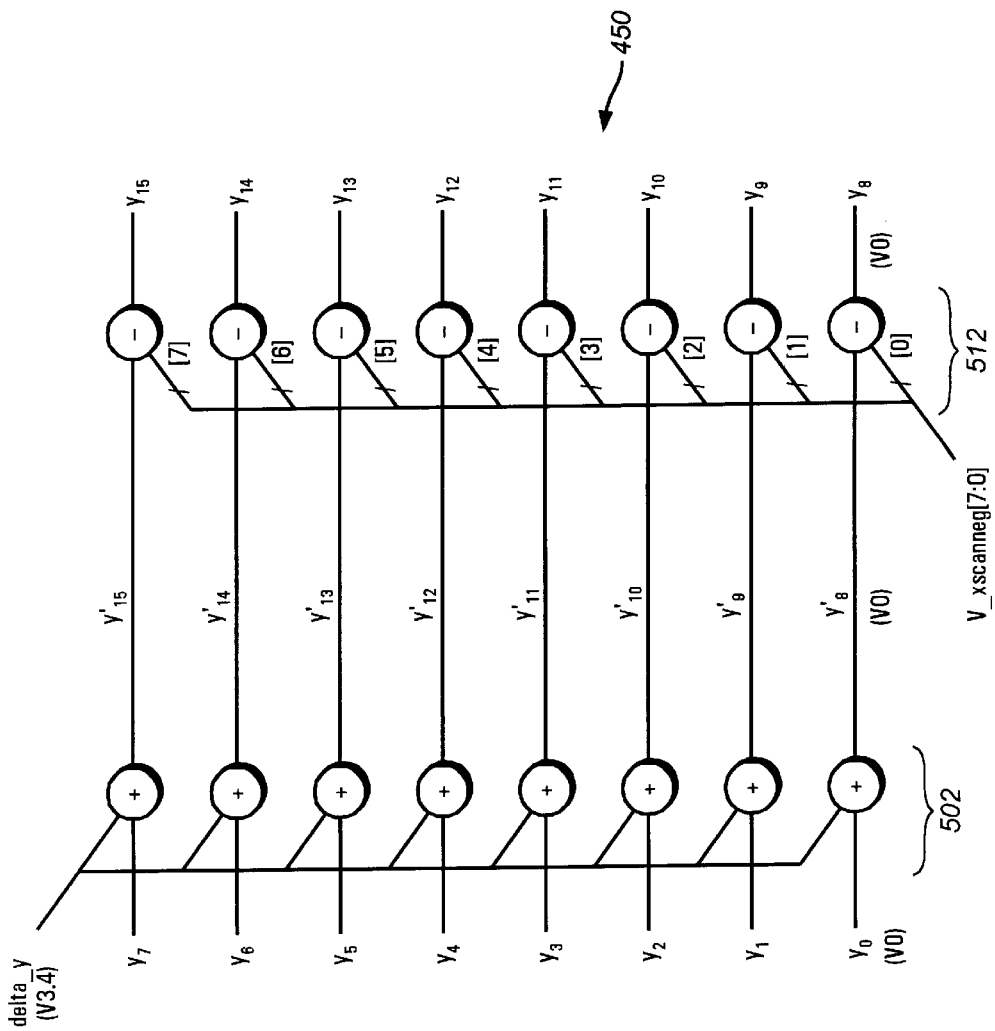

Specifically, the original y values $\{y_7 \ldots y_0\}$ at instruction 502 of FIG. 8E are incremented by the scaler delta_y, yielding $\{y'_{15} \ldots y'_8\}$. These intermediate y values, however, must be adjusted if the corresponding intermediate d value $\{d'_{15} \ldots d'_8\}$ was outside its permissible range. Therefore, the vector V_xscanneg[7 ... 0] is subtracted from the intermediate y values $\{y'_{15} \ldots y'_8\}$, yielding the actual values $\{y_{15} \ldots y_8\}$. This occurs because for each intermediate value $\{d'_{15} \ldots d'_8\}$ that was determined to be within its boundary conditions at instructions 508 and 510 the series instructions 506, the corresponding value of V_xscanneg[7 ... 0] was set to zero. If outside its boundary conditions, the vector V_xscanneg[7 ... 0] was set equal to xscanlength. So the corresponding intermediate value of $\{y'_{15} \ldots y'_8\}$ was decremented by an appropriate amount at step 512. So, as a result of instruction 512, the final values for $\{y_{15} \ldots y_8\}$ are provided in the register V0.

Turning back to FIG. 8B, V_xscanneg[7 ... 0] is then converted into an appropriate vector to adjust the $\{d'_{15} \ldots d'_8\}$ values. This is illustrated in FIG. 8D, where a $2\Delta x$ routine 514 is effectively executed in parallel for each element of V_xscanneg[7 ... 0]. This is done in instruction 516 (FIG. 8D), where for each element of the vector, if that element is not equal to zero (i.e., contained xscanlength), it is now set to contain $2\Delta x$. This is the appropriate value to correct the corresponding $d'_i$, and this resulting vector V_2$\Delta$x[7 ... 0] is used in step 518 of FIG. 8A, where V_d'[7 ... 0] (containing $\{d'_{15} \ldots d'_8\}$) has added to it V_2$\Delta$x[7 ... 0], yielding the corrected values of $\{d_{15} \ldots d_8\}$.

Thus, through the instructions illustrated in FIGS. 8A–8E, the next eight $y_i$ and $d_i$ values are simultaneously generated based on the previous eight $y_i$ and $d_i$ values. This is repeated as many times as is necessary to create all desired $y_i$ values.

Turning to FIGS. 9A–9D, illustrated are a series of instructions similar to that of FIGS. 8A–8E, but instead being the NEXT_POS series of instructions 460 for execution when delta_d is positive rather than negative. Only the differences between the series of instruction 460 and the series of instruction 450 will be described in conjunction with FIGS. 9A–9D. Proceeding to FIG. 9A, the instructions 600 and 618 are effectively equivalent to instructions 500 and 518 of FIG. 8A, with the exception that the vector V_2Δx[7 . . . 0] is subtracted from the intermediate values $\{d'_{15} \ldots d'_0\}$ in step 618. This is because for a positive delta_d, the only possible boundary condition that the intermediate vectors $\{d'_{15} \ldots d'_7\}$ could exceed is that they be greater than incrE (which is equal to 2Δy). If this is determined to be the case, instruction 620 subtracts the appropriate amount from $\{d'_{15} \ldots d'_8\}$, yielding the adjusted error values $\{d_{15} \ldots d'_8\}$.

Figure 9A:
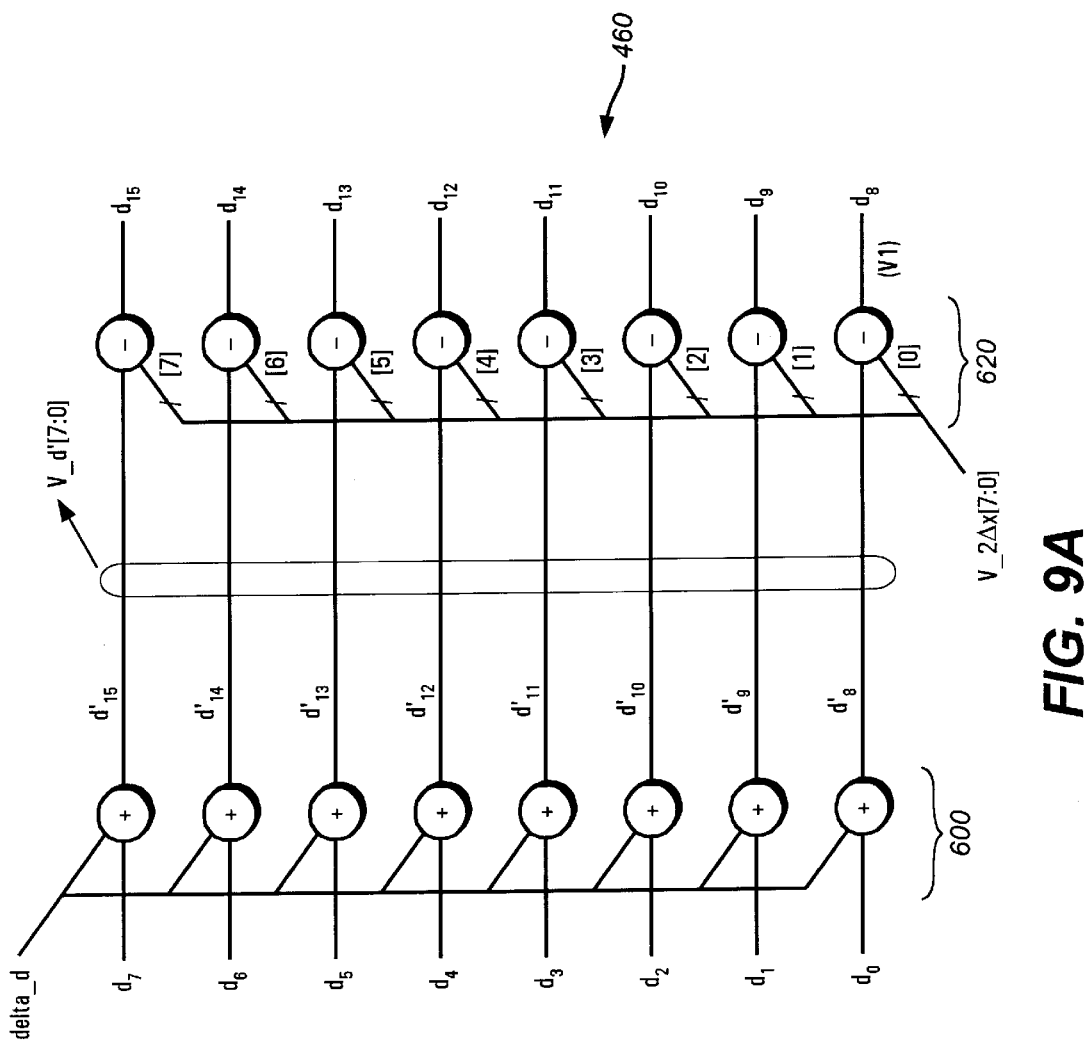
FIGS. 9A–D are further parallel execution diagrams showing parallel generation of sequential points on a line according to the invention.
Figure 9B:
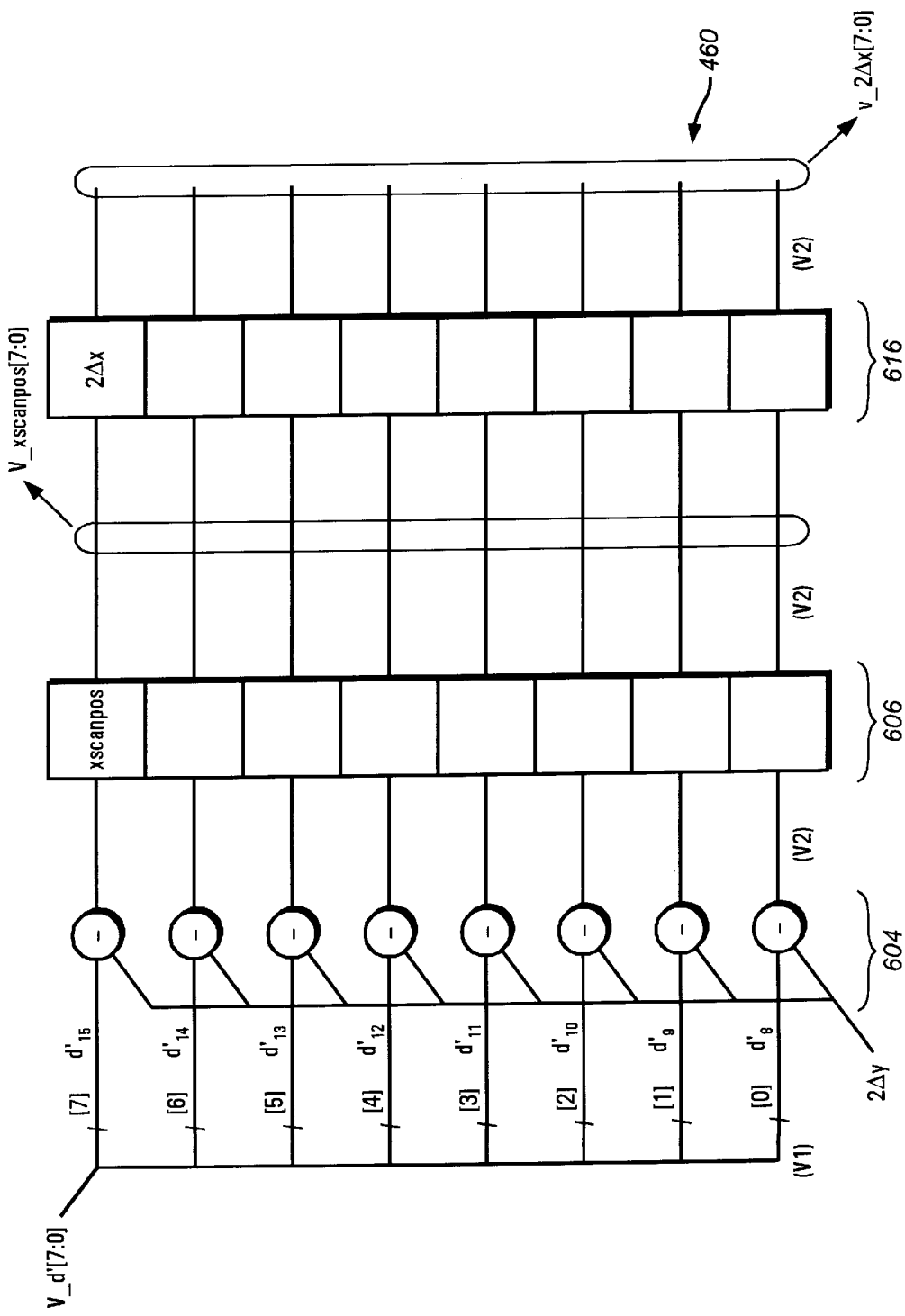
Figure 9C:
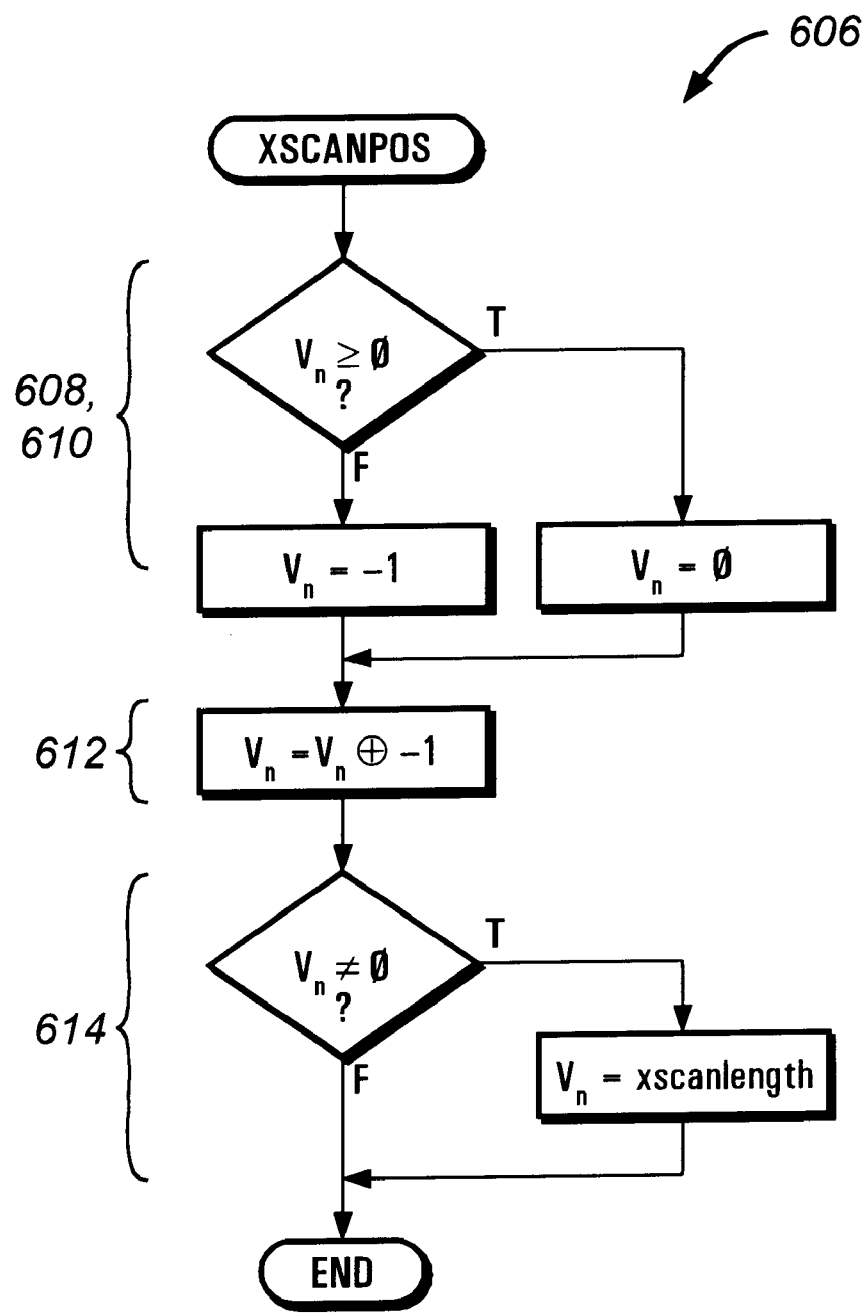

Turning to FIG. 9B, this figure in large part tracks the operations in FIG. 8B. However, at instruction 604, rather than subtracting the value of incrNE as is done in instruction 504 of FIG. 8B, the value of incrE is subtracted from intermediate variables $\{d'_{15} \ldots d'_8\}$. This value is 2Δy. The resulting intermediate values in the vector V2 are then processed by an XSCANPOS routine 606, illustrated in FIG. 9C. This routine, similar to the XSCANNEG routine 506 of FIG. 8C, instead determines whether the intermediate values $\{d'_{15} \ldots d'_8\}$ exceed incrE, or 2Δy. If this is the case, a corresponding xscanlength value is loaded into the vector, which will be added to the intermediate y' values. At instructions 608 and 610, it is determined whether each element of the vector $v_n$ is greater than or equal to zero. If greater than or equal to zero, $v_n$ is set to zero. Otherwise, $v_n$ is set to –1. At instruction 612, each element of $v_n$ is exclusive OR'd with –1. At this point, for each element of $v_n$ that was greater than or equal to zero (i.e., exceeded the boundary condition), that $v_n$ contains a value other than zero. This is tested in instruction 614, which for each element $v_n$ of the vector which is not equal to zero, that element is loaded with xscanlength.

Figure 9D:
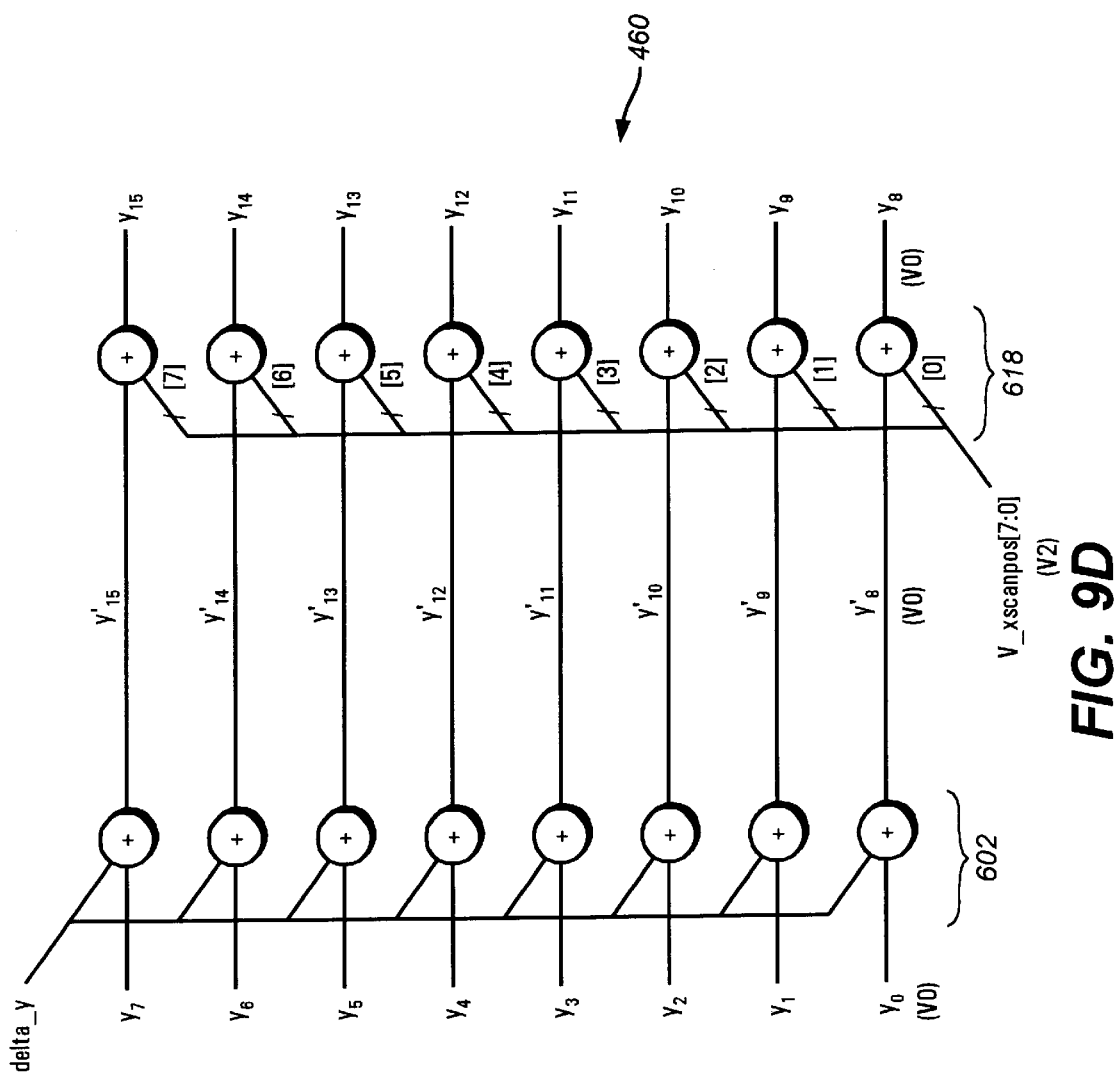

This value, identified as V_xscanpos[7 . . . 0] is then used in FIG. 9D, where it is added to $\{y'_{15} \ldots y'_8\}$, at instruction 618. This should be compared to FIG. 8E, where V_scanneg[7 . . . 0] is instead subtracted from the intermediate y values $\{y'_{15} \ldots y'_8\}$. The 2Δx routine 616 is identical to the 2Δx routine 514 of FIG. 8D.

Figure 10:
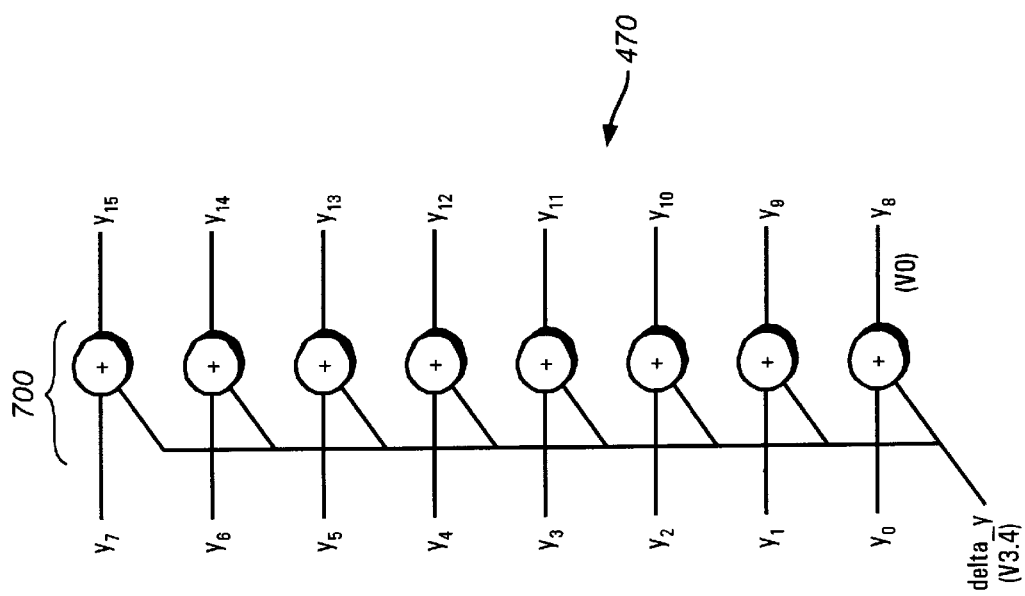
FIG. 10 is a parallel execution diagram illustrating sequential generation of points on a line where the slope is of a particular value.

Turning to FIG. 10, shown is the NEXT_ZERO series of instructions 470, where in this case instruction 700 simply adds the scaler delta_to $y_7 \ldots y_0$ to yield $y_{15} \ldots y_8$. This is repeated for each eight values of y desired. Of note, there is no error, or remainder, value $d_i$, so this is a highly efficient routine.

Figure 11:
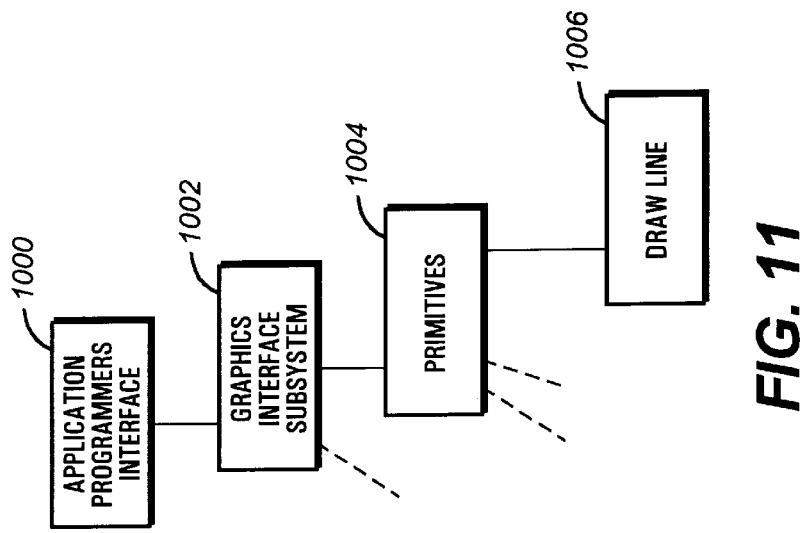
FIG. 11 is a block diagram illustrating how the line drawing according to the invention would be employed in a graphics system.

Turning to FIG. 11, shown is a block diagram illustration of how the line drawing routine according to the invention could be employed in a graphics system. Shown are a series of modules that would form part of an application programmer's interface 1000 to the graphic system. This interface 1000 would include a graphics interface subsystem 1002, called create and draw various types of images and displays. Included in its submodules would be a graphics primitives submodule 1004, which in turn would call a line drawing submodule 1006. This submodule 1006 would preferably create the line using the routine 900 of FIGS. 6A–B. This series of modules 1000–1006 would preferably be stored either as part of the operating system on hard disk or other readable media, or as part of an embedded read only memory toolbox.

Figure 12:
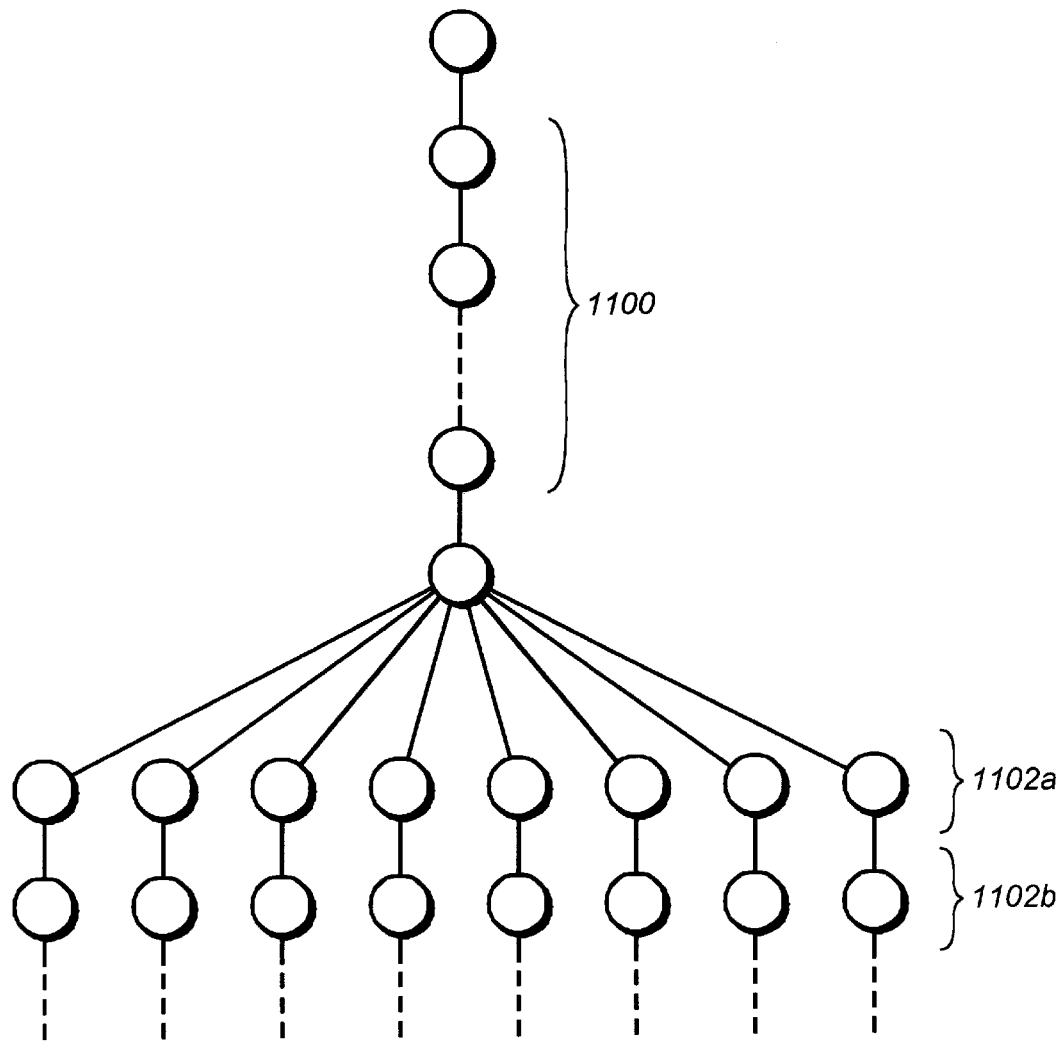
FIG. 12 is a block diagram illustrating the serial then parallel nature of the generation of sequential points on a line according to the invention.

FIG. 12 summarizes the serial then parallel operation of the routine 900. Two groups of operations are shown: a series group of operations 1100 in which n initial Y values and error (displacement) values are calculated in series, and then a parallel group of operations 1102 in which subsequent n Y values and error values are calculated in parallel. By the disclosed techniques, lines are calculated and drawn more quickly and efficiently because of the parallel nature of group 1102.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

```
.386p
MODEL MEDIUM
;       Bresenham's Line Algorithm                                Brian Longhenry
;       December 18, 1995
;
;       This algorithm implements the Bresenham line algorithm in MEU code to
;           calculate all of x,y the coordinates of an angled line which has a
;           slope greater than 0 and less than or equal to 1. This algorithm
;           would need some minor additions to expand its coverage to handle lines
;           of other slopes. For example, giving the algorithm a negative
;           xscanlength value would probably be most of what is required to expand
;           the algorithm to be able to handle lines with a slope greater than or
;           equal to –1 and less than 0. There are 4 cases of angled lines which
;           this algorithm would have to identify and handle. They are:
;               –infinity < slope < –1
;               –1 < slope < 0
;               0 < slope < 1          (This case is already handled below.)
;               1 < slope < infinity
;
;       Setup:
;       0 < slope <= 1
;       v0 = {DC,DC,DC,DC,DC,DC,DC,x0,y0}     (word values)
;       v1 = {yend,xend,yend,xend,DC,DC,DC,xscanlength}
;       ecx = length of line in x dimension (delta x)
```

-continued

```
;----------------------------------------------------------------------
include MEUDEFS.INC
public __Bresenham
__TEXT  segment       use32
__Bresenham  proc  near
;     **** beginning of setup section for this test ****
mov     esi,0041f000h
mov     edi,0041f100h
mov     ecx,00000010h
mov     ebp,0041f300h
mov     dword ptr [ebp],00000000h  ;   this sets up x0 & y0
vldw    v0, [ebp]
mov     dword ptr [ebp],00000008h
mov     dword ptr [ebp + 8],000a000fh
mov     dword ptr [ebp + 12],000a000fh
vldw    v1, [ebp]
;     **** end of setup section for this test ****
{sub sub sub sub asr1 sub sub sub}word v2,v1,v0(01010zzz)
;     (v2 = {dy,dx,dy,dx,y0/2,?,?,xscanlength})
dec ecx         ; decrement ecx because startpoints are location 0 (first
8 points are 0–7)
{asl1 sub sub asl1 asl1 sub sub sub}word v2,v2,v2(7z434zzz)
;     (v2 = {2dy,dx,dy-dx,y0;2dx,?,?,xscanlength})
mov ebx,ecx ; save this value for completing the end of the line later on
{sub movb movb movb movb movb movb movb}word v2,v2,v2(67543zz0)
;     (v2 = {2dy-dx,2dy,dy-dx,y0,2dx,0,0,xscanlength}
and ebx,00000007h
{movb movb asl1 movb movb movb movb movb}word v2,v2,v2(76543zz0)
;     (v2 = {2dy-dx,2dy,2(dy-dx),y0,2dx,0,0,xscanlength} =
;               {d (d0),incrE,incrNE,y0,2dx,0,0,xscanlength})
inc ebx
{movb add add movb movb movb movb movb}word v1,v1,v2(7zz7zzz7)
;     v1 = {do,xend,yend,d0,0,0,0,d0}
sar ecx,3    ; divide ecx by 8
;     **** begin finding d & y values for first eight points    ****
;     **** by serially executing Bresenham's algorithm          ****
{add movb movb add movb movb movb movb}word v3,v2,v2(5zz0zzzz)
{add movb movb movb movb movb movb movb}word v2,v2,v2(66543740)
;     v3 = {d0+incrNE,0,0,y0+xscanlength,0,0,0,0}
;     v2 = {d0+incrE,incrE,incrNE,y0,2dx,d0,y0,xscanlength}
{mvgez acum acum mvgez acum acum acum acum}word v2,v1,v3(7zz4zzzz}
;     v2 = {d1,incrE,incrNE,y1,2dx,d0,y0,xscanlength}
{add add add add add add movb add}word v0,v0,v2(zzzzzz4z)
{movb add add movb movb movb movb add}word v1,v1,v2(7zz7zz7z)
;     (v0 = {DC,DC,DC,DC,DC,DC,y1,y0})
;     v1 = {d1,xend,yend,d1,0,0,d1,d0}
;     -----------------------------------------------------
{add movb movb add movb movb movb movb}word v3,v2,v2(5zz0zzzz)
{add movb movb movb movb movb movb movb}word v2,v2,v2(66543210)
;     v3 = {d1+incrNE,0,0,y1+xscanlength,0,0,0,0}
;     v2 = {d1+incrE,incrE,incrNE,y1,2dx,d0,y0,xscanlength}
{mvgez acum acum mvgez acum acum acum acum}word v2,v1,v3(7zz4zzzz)
;     v2 = {d2,incrE,incrNE,y2,2dx,d0,y0,xscanlength}
{add add add add add movb add add}word v0,v0,v2(zzzzz4zz)
{movb add add movb movb movb add add}word v1,v1,v2(7zz7z7zz)
;     (v0 ={DC,DC,DC,DC,DC,y2,y1,y0})
;     v1 = {d2,xend,yend,d2,0,d2,d1,d0}
;     -----------------------------------------------------
{add movb movb add movb movb movb movb}word v3,v2,v2(5zz0zzzz)
{add movb movb movb movb movb movb movb}word v2,v2,v2(66543210)
;     v3 = {d2+incrNE,0,0,y2+xscanlength,0,0,0,0}
;     v2 = {d2+incrE,incrE,incrNE,y2,2dx,d0,y0,xscanlength}
{mvgez acum acum mvgez acum acum acum acum}word v2,v1,v3(7zz4zzzz)
;     v2 = {d3,incrE,incrNE,y3,2dx,d0,y0,xscanlength}
{add add add add movb add add add}word v0,v0,v2(zzzz4zzz)
{movb add add movb add add add)word v1,v1,v2(7zz77zzz)
;     (v0 = {DC,DC,DC,DC,y3,y2,y1,y0})
;     v1 = {d3,xend,yend,d3,d3,d2,d1,d0}
;     -----------------------------------------------------
{add movb movb add movb movb movb movb}word v3,v2,v2(5zz0zzzz)
{add movb movb movb movb movb movb movb}word v2,v2,v2(66543210)
;     v3 = {d3+incrNE,0,0,y3+xscanlength,0,0,0,0}
;     v2 = {d3+incrE,incrE,incrNE,y3,2dx,d0,y0,xscanlength}
{mvgez acum acum mvgez acum acum acum acum}word v2,v1,v3(7zz4zzzz)
;     v2 = (d4,incrE,incrNE,y4,2dx,d0,y0,xscanlength}
{add add add movb add add add add}word v0,v0,v2(zzz4zzzz)
{movb add add movb add add add movb}word v3,v3,v2(7zz7zzz7)
;     (v0 = {DC,DC,DC,y4,y3,y2,y1,y0})
;     v3 = {d4,0,0,d4,0,0,0,d4}
```

```
;       ------------------------------------------------------
{add acum acum add acum acum acum acum}word v1,v2,v2(5zz0zzzz)
{add movb movb movb movb movb movb movb}word v2,v2,v2(66543210)
;       v1 = {d4+incrNE,xend,yend,y4+xscanlength,d3,d2,d1,d0}
;       v2 = {d4+incrE,incrE,incrNE,y4,2dx,d0,y0,xscanlength}
{mvgez acum acum mvgez acum acum acum acum}word v2,v3,v1(7zz4zzzz)
;       v2 = {d5,incrE,incrNE,y5,2dx,d0,y0,xscanlength}
{add add movb add add add add add}word v0,v0,v2(zz4zzzzz)
{movb add add movb add add movb add}word v3,v3,v2(7zz7zz7z)
;       (v0 = {DC,DC,y5,y4,y3,y2,y1,y0})
;       v3 = (d5,0,0,d5,0,0,d5,d4}
;       ------------------------------------------------------
{add acum acum add acum acum acum acum}word v1,v2,v2(5zz0zzzz)
{add movb movb movb movb movb movb movb}word v2,v2,v2(66543210)
;       v1 = {d5+incrNE,xend,yend,y5+xscanlength,d3,d2,d1,d0}
;       v2 = {d5+incrE,incrE,incrNE,y5,2dx,d0,y0,xscanlength}
{mvgez acum acum mvgez acum acum acum acum}word v2,v3,v1(7zz4zzzz)
;       v2 = {d6,incrE,incrNE,y6,2dx,d0,y0,xscanlength}
{add movb add add add add add add}word v0,v0,v2(z4zzzzzz)
{movb add add movb add movb add add}word v3,v3,v2(7zz7z7zz)
;       (v0 = {DC,y6,y5,y4,y3,y2,y1,y0})
;       v3 = {d6,0,0,d6,0,d6,d5,d4}
;       ------------------------------------------------------
{add acum acum add acum acum acum acum}word v1,v2,v2(5zz0zzzz)
{add movb movb movb movb movb movb movb}word v2,v2,v2(66543210)
;       v1 = {d6+incrNE,xend,yend,y6+xscanlength,d3,d2,d1,d0}
;       v2 = {d6+incrE,incrE,incrNE,y6,2dx,d0,y0,xscanlength}
{mvgez acum acum mvgez acum acum acum acum}word v2,v3,v1(7zz4zzzz)
;       v2 = {d7,incrE,incrNE,y7,2dx,d0,y0,xscanlength}
{movb add add add add add add add}word v0,v0,v2(4zzzzzzz)
;       (v0 = {y7,y6,y5,y4,y3,y2,y1,y0})     **** Store these into memory ****
;            **** v0 is now also set up for the loop algorithm down below ****
;jecxz LineEnd    ; If the line was 8 pixels or fewer long in x dimension,
                  ;      there is no need in going on . . . we have all we
need.
test    ecx,0ffffffffh
jz      LineEnd
{movb add add movb movb add add add}word v3,v3,v2(7zz77zzz)
;       v3 = {d7,0,0,d7,d7,d6,d5,d4}
;       ------------------------------------------------------
;       Now find the delta d and y values (from d0 to d8 and y0 to y8)
;       so d and y values may be extrapolated to every eighth position.
{add acum acum add acum acum acum acum}word v1,v2,v2(5zz0zzzz)
{add movb movb movb movb movb movb movb}word v2,v2,v2(66543210)
;       v1 = {d7+incrNE,xend,yend,y7+xscanlength,d3,d2,d1,d0}
;       v2 = {d7+incrE,incrE,incrNE,y7,2dx,d0,y0,xscanlength}
{mvgez acum acum mvgez acum acum acum acum}word v2,v3,v1(7zz4zzzz)
;       v2 = {d8,incrE,incrNE,y8,2dx,d0,y0,xscanlength}
{add movb movb add add add add add}word v3,v3,v1(z56zzzzz)
;       v3 = {d7,yend,xend,d7,d7,d6,d5,d4}
{movb movb movb movb add add add add}word v1,v1,v3(3210zzzz)
;       **** v1 = {d7,d6,d5,d4,d3,d2,d1,d0} **** (Important for later use)
{sub acum acum sub acum acum acum acum}word v3,v2,v2(2zz1zzzz)
;       v3 = {delta d,yend,xend,delta y,d7,d6,d5,d4}
{movb mova mova movb mova movb movb mova}word v3,v2,v3(7zz4z65z)
;       v3 = {delta d,incrE,incrNE,delta y,2dx,yend,xend,xscanlength}
;       **** This is also important for the following algorithm ****
;       ------------------------------------------------------
;************************************************************
;       These are what the results of delta d and delta y mean:
;       1)      If delta d = 0, then the slope of the line is exactly
;                       on the "eighth" border displayed by delta y (ie. if
;                       delta y = 5, then the line's slope is exactly 5/8.).
;               2)      If delta d < 0, then the slope of the line is less
;                       than the "eighth" border displayed by delta y (ie. if
;                       delta y = 5, then the line's slope is less than 5/8.).
;               3)      If delta d > 0, then the slope of the line is greater
;                       than the "eighth" border displayed by delta y (ie. if
;                       delta y = 5, then the line's slope is greater than 5/8.).
;
;               FYI:    The largest that delta d can get to be in magnitude
;                       is dx. That delta d corresponds to a line whose slope
;                       is exactly in between two "eighth" slope lines (ie.
;                       a line of slope 11/16 would have a delta d equal in
;                       magnitude to dx at every eighth point of the line.).
;
;               FYI:    Because the conditional move condition "mvlz" is
;                       not "mvlez" (the condition of zero is covered by "mvgez"),
;                       the boundary conditions of d in Bresenham's algorithm
```

-continued

```
;               will always be incrNE <= d < incrE. Also due to this fact,
;               delta d will always be -dx <= delta d < dx
;
;       FYI:    To find the value of d and y at every eighth horizontal
;               position, add delta d and delta y to the previous eighth
;               values of d and y. If that action makes d violate the
;               boundary conditions listed above, add or subtract 2dx from
;               d and shift y accordingly. If 2dx is subtracted from d,
;               y must be incremented by 1. If 2dx is added to d, y must
;               be decremented by 1.
;****************************************************************
;       ****    you now have everything you need to begin the      ****
;       ****        loop to get every eighth d and y values        ****
;       ****        starting with the first eight locations        ****
;       Assume v1 = {d7,d6,d5,d4,d3,d2,d1,d0}
;       Assume v0 = {y7,y6,y5,y4,y3,y2,y1,y0}
;       Assume v3 = {delta d,incrE,incrNE,delta y,2dx,yend,xend,xscanlength}
;       If d8p - incrE is greater than or equal to zero, then d8p is too
;       high and must be reduced by 2dx, which will increment y8p.
;       If d8p - incrNE is less than zero, then d8p is too low and must
;       be increased by 2dx, which will decrement y8p.
;       Now, make the appropriate comparisons and determine if shifts are
;       needed.
vstw    [esi], v3
xor     eax,eax
mov     ax,[esi + 14]
cmp     ax,0                    ; ax is delta d
jg      BresLoopPos ; delta d is greater than 0
je      BresLoopZero ; delta d is equal to 0
;       --------------------------------------------------------
BresLoopNeg:                    ; loop for negative delta d
vstw    [esi], v0
mov     ax, [esi + 0]
{add add add add add add add add}word v1,v1,v3(77777777)
;       (v1 = {d15p,d14p,d13p,d12p,d11p,d10p,d9p,d8p})
mov byte ptr [edi + eax + 0],0ffh ; arbitrary immediate value for now
{add add add add add add add add}word v0,v0,v3(44444444)
;       (v0 = {y15p,y14p,y13p,y12p,y11p,y10p,y9P,y8p})
mov     ax, [esi + 2]
mov     byte ptr [edi + eax + 1],0ffh
;       Now we must check for slots whose d values are too low.
{sub sub sub sub sub sub sub sub}word v2,v1,v3(55555555)
;       v2 = {d15p-incrNE,d14p-incrNE,d13p-incrNE, . . . }
mov     ax, [esi + 4]
mov     byte ptr [edi + eax + 2],0ffh
{mvgez mvgez mvgez mvgez mvgez mvgez mvgez mvgez}word v2,v2,v3(zzzzzzzz)
mov     ax, [esi + 6]
mov     byte ptr [edi + eax + 3],0ffh
;       Any slots that have a non-zero value in v2 at this point have
;       a dxp value which is too low and must have the y and d values
;       altered accordingly. All other slots have a 0 and no action will
;       therefore be taken on them.
{mvnz mvnz mvnz mvnz mvnz mvnz mvnz mvnz}word v2,v2,v3(00000000)
mov     ax, [esi + 8]
{sub sub sub sub sub sub sub sub}word v0,v0,v2(76543210)
mov     byte ptr [edi + eax + 4],0ffh
{mvnz mvnz mvnz mvnz mvnz mvnz mvnz mvnz}word v2,v2,v3(33333333)
mov     ax, [esi + 10]
{add add add add add add add add}word v1,v1,v2(76543210)
mov     byte ptr [edi + eax + 5],0ffh
mov     ax, [esi + 12]
mov     byte ptr [edi + eax + 6],0ffh
mov     ax, [esi + 14]
mov     byte ptr [edi + eax + 7],0ffh
add     edi,8
;       At this point, any slots whose d value was too low had their d and
;       y values altered accordingly. Therefore, we are left with the
;       real values of y and d for these slots.
;       v0 = {y15,y14,y13,y12,y11,y10,y9,y8}
;       v1 = {d15,d14,d13,d12,d11,d10,d9,d8}
;       loop    BresLoopNeg
dec     ecx
jnz     BresLoopNeg
jmp     LineEnd                 ; finish saving off the final pixels in the line
;       --------------------------------------------------------
BresLoopZero:                   ; loop for delta d = 0
;       This is the unique case where no shifting of d's and y's is
;       necessary. Therefore, we can simply continue punching out
;       8 y values at a time. Cool, huh?
```

-continued

```
vstw    [esi], v0
mov     ax, [esi + 0]
mov     byte ptr [edi + eax + 0],0ffh    ; arbitrary immediate value for now
mov     ax, [esi + 2]
mov     byte ptr [edi + eax + 1],0ffh
mov     ax, [esi + 4]
mov     byte ptr [edi + eax + 2],0ffh
mov     ax, [esi + 6]
mov     byte ptr [edi + eax + 3],0ffh
{add add add add add add add add}word v0,v0,v3(44444444)
;       v0 = {y15,y14,y13,y12,y11,y10,y9,y8}
mov     ax, [esi + 8]
mov     byte ptr [edi + eax + 4],0ffh
mov     ax, [esi + 10]
mov     byte ptr [edi + eax + 5],0ffh
mov     ax, [esi + 12]
mov     byte ptr [edi + eax + 6],0ffh
mov     ax, [esi + 14]
mov     byte ptr [edi + eax + 7],0ffh
add     edi,8
;       loop    BresLoopZero
dec     ecx
jnz     BresLoopZero
jmp     LineEnd                  ; finish saving off the final pixels in the line
;       --------------------------------------------------------
BresLoopPos:                     ; loop for positive delta d
vstw    [esi], v0
mov     ax, [esi + 0]
{add add add add add add add add}word v1,v1,v3(77777777)
;       (v1 = {d15p,d14p,d13p,d12p,d11p,d10p,d9p,d8p})
mov     byte ptr [edi + eax + 0],0ffh    ; arbitrary immediate value for now
{add add add add add add add add}word v0,v0,v3(44444444)
;       (v0 = {y15p,y14p,y13p,y12p,y11p,y10p,y9p,y8p})
mov     ax, [esi + 2]
mov     byte ptr [edi +eax + 1],0ffh
;       Now we must check for slots whose d values are too high.
{sub sub sub sub sub sub sub sub}word v2,v1,v3(66666666)
;       v2 = {d15p–incrE,d14p–incrE,d13p–incrE,d12p–incrE, . . . }
mov     ax, [esi + 4]
mov     byte ptr [edi + eax + 2],0ffh
{mvgez mvgez mvgez mvgez mvgez mvgez mvgez}word v2,v2,v3(zzzzzzzz)
mov     ax, [esi + 6]
{mvnz mvnz mvnz mvnz mvnz mvnz mvnz mvnz}word v2,v2,v3(nnnnnnnn)
mov     byte ptr [edi + eax + 3],0ffh
{xor xor xor xor xor xor xor xor}word v2,v2,v3(nnnnnnnn)
mov     ax, [esi + 8]
;       Any slots that have a –1 in v2 at this point have a dxp value
;       which is too high and must have the y and d values altered
;       accordingly. All other slots have a 0 and no action will
;       therefore be taken on them.
{mvnz mvnz mvnz mvnz mvnz mvnz mvnz mvnz}word v2,v2,v3(00000000)
mov     byte ptr [edi + eax + 4],0ffh
{add add add add add add add add}word v0,v0,v2(76543210)
mov     ax, [esi + 10]
{mvnz mvnz mvnz mvnz mvnz mvnz mvnz mvnz}word v2,v2,v3(33333333)
mov     byte ptr [edi + eax + 5],0ffh
{sub sub sub sub sub sub sub sub}word v1,v1,v2(76543210)
mov     ax, [esi + 12]
mov     byte ptr [edi + eax + 6],0ffh
mov     ax, [esi + 14]
mov     byte ptr [edi + eax + 7],0ffh
add     edi,8
;       At this point, any slots whose value was too high had their d
;       and y values altered accordingly. Therefore, we are left with
;       the real values of y and d for these slots.
;       v0 = {y15,y14,y13,y12,y11,y10,y9,y8}    **** Store these into memory ****
;       v1 = {d15,d14,d13,d12,d11,d10,d9,d8}
;           loop    BresLoopPos
dec     ecx
jnz     BresLoopPos
jmp     LineEnd                  ; finish saving off the final pixels in the line
;       --------------------------------------------------------
LineEnd:                         ; This finishes saving the final pixels of the line.
                                 ; ebx contains the number of final endpoints
to save
                                 ; off (1–8).
vstw    [es1], v0
mov     ax, [esi + 0]
mov     byte ptr [edi + eax + 0],0ffh    ;    arbitrary immediate value for now
```

-continued

```
dec     ebx
jz      LineEndDone
mov     ax, [esi + 2]
mov     byte ptr [edi + eax + 1],0ffh
dec     ebx
jz      LineEndDone
mov     ax, [esi + 4]
mov     byte ptr [edi + eax + 2],0ffh
dec     ebx
jz      LineEndDone
mov     ax, [esi + 6]
mov     byte ptr [edi + eax + 3],0ffh
dec     ebx
jz      LineEndDone
mov     ax, [esi + 8]
mov     byte ptr [edi + eax + 4],0ffh
dec     ebx
jz      LineEndDone
mov     ax, [esi + 10]
mov     byte ptr [edi + eax + 5],0ffh
dec     ebx
jz      LineEndDone
mov     ax, [esi + 12]
mov     byte ptr [edi + eax + 6],0ffh
dec     ebx
jz      LineEndDone
mov     ax, [esi + 14]
mov     byte ptr [edi + eax + 7],0ffh
LineEndDone:
_Bresenham    endp
_TEXT ends
end
```

What is claimed is:

1. A method of calculating an integral series of points for a line in a computer system, the method comprising the steps of:

providing a vector processing unit with vector operand routing and multiple operations per instruction;

calculating in parallel on the vector processing unit a next n error values from a first n error values; and calculating in parallel on the vector processing unit a next n y values from a first n y values.

2. The method of claim 1 further comprising the steps of:

before said steps of calculating in parallel, calculating in series a first n+1 error values.

3. The method of claim 1 further comprising the steps of:

before said steps of calculating in parallel, calculating in series a first n+1 y value.

4. The method of claim 3 further comprising the steps of:

precalculating a $\Delta x$, $\Delta y$, $d_0$ error value, x, and y value before said step of calculating in series.

5. The method of claim 1 further comprising the steps of:

calculating a delta_d value; and executing one of three sets of instructions dependent on whether the delta_d value is greater than zero, less than zero, or zero.

6. The method of claim 5, wherein the step of executing the instructions if delta_d is less than zero further comprises the steps of:

adding in parallel delta_d to the first n error values yielding a first n intermediate error values;

for each of the first n intermediate error values that are less than a value $2(\Delta y - \Delta x)$, adding in parallel a value $2\Delta x$ to a corresponding one of the first n intermediate error values yielding the next n error values; and for each of the first n intermediate error values that are less than $2(\Delta y - \Delta x)$, subtracting in parallel an offset from a corresponding one of the first n y values yielding the next n y values.

7. The method of claim 5, wherein the step of executing the instructions if delta_d is greater zero further comprises the steps of:

adding in parallel delta_d to the first n error values yielding a first n intermediate error values;

for each of the first n intermediate error values that are greater than a value $2\Delta y$, subtracting in parallel a value $2\Delta x$ to a corresponding one of the first n intermediate error values yielding the next n error values; and for each of the first n intermediate error values that are greater than $2\Delta y$, adding in parallel an offset from a corresponding one of the first n y values yielding the next n y values.

8. The method of claim 5 further comprising the steps of:

if delta_d is equal to zero, adding in parallel a delta_y value to the first n y values yielding the next n y values.

9. A computer system for calculating an integral series of y values for points for a line, the system comprising:

a vector processing unit with vector operand routing and multiple operations per instruction;

means for calculating in parallel on the vector processing unit a next n error values from a first n error values; and means for calculating in parallel on the vector processing unit a next n y values from a first n y values.

10. A computer program product for controlling a vector processing unit, the program comprising:

a computer readable medium, means on said computer readable medium for causing a vector processing unit with vector operand routing and multiple operations per instruction to calculate in parallel a next n error values from a first n error values; and means on said computer readable medium for causing a vector processing unit with vector operand routing and multiple operations per instruction to calculate in parallel a next n y values from a first n y values.

11. A system for drawing lines on a video display comprising:

a processor;

a multimedia extension unit coupled to the processor having operand routing and operation selection;

a video system;

a code segment for execution by said processor and said multimedia extension unit, said code segment including:

series code for calculating a first n y values and error values according to Bresenham's line drawing algorithm; and parallel code for calculating a second n y values and a second n error values in parallel based on the first n y values and the first n error value;

wherein said video system is for displaying a line calculated by said code segment.

* * * * *